(12) United States Patent
Tsukagoshi

(10) Patent No.: US 10,567,702 B2
(45) Date of Patent: Feb. 18, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 15/758,997

(22) PCT Filed: Sep. 13, 2016

(86) PCT No.: PCT/JP2016/076916
§ 371 (c)(1),
(2) Date: Mar. 9, 2018

(87) PCT Pub. No.: WO2017/056956
PCT Pub. Date: Apr. 6, 2017

(65) Prior Publication Data
US 2019/0268565 A1    Aug. 29, 2019

(30) Foreign Application Priority Data

Sep. 30, 2015  (JP) ................................ 2015-194994

(51) Int. Cl.
*H04N 7/01* (2006.01)
*H04N 7/035* (2006.01)
*H04N 7/015* (2006.01)

(52) U.S. Cl.
CPC .......... *H04N 7/0127* (2013.01); *H04N 7/015* (2013.01); *H04N 7/0122* (2013.01); *H04N 7/0125* (2013.01); *H04N 7/035* (2013.01)

(58) Field of Classification Search
None
See application file for complete search history.

(56) References Cited

U.S. PATENT DOCUMENTS

2002/0090138 A1\* 7/2002 Hamanaka ............ H04N 19/37
382/239

FOREIGN PATENT DOCUMENTS

| JP | 2008-543142 A | 11/2008 |
| WO | 2008/086423 A2 | 7/2008 |
| WO | 2015/076277 A1 | 5/2015 |

OTHER PUBLICATIONS

ITU-T Recommendation H.262 "Transmission of Non-Telephone Signals//Information Technologoy—Generic Coding of Moving Pictures and Associated Audio Information: Video", ITU-T, (Jul. 1995), [Online], Jul. 10, 1995, [retrieved on Jan. 25, 2012], Retrieved from the Internet: <URL: http://www.itu.int/rec/dologin_pub.asp?lang=e&id=T-REC-H. 262-199507-S!!PDF-E&type=items>, Section 7.11 and Section D. 7. 5. 2. (211 pages).

(Continued)

*Primary Examiner* — Christopher Braniff
(74) *Attorney, Agent, or Firm* — Oblon, McClelland, Maier & Neustadt, L.L.P.

(57) ABSTRACT

To transmit ultra-high-definition image data with high frame rate along with preferable backward compatibility on the reception side.

Ultra-high-definition image data with high frame rate is processed to obtain image data in a base format for obtaining a high-definition image with base frame rate, image data in a first extension format for obtaining an ultra-high-definition image with base frame rate, and image data in a second extension format for obtaining an ultra-high-definition image with high frame rate. A base video stream including encoded image data of the image data in the base format, and two or one extended video stream including encoded image data of the image data in the first extension format and encoded image data of the image data in the second exten- (Continued)

sion format are generated. A container in a predetermined format including the base stream and the extended video streams is transmitted.

17 Claims, 30 Drawing Sheets

(56) References Cited

OTHER PUBLICATIONS

International Search Report dated Nov. 1, 2016 in PCT/JP2016/076916, filed on Sep. 13, 2016.

* cited by examiner

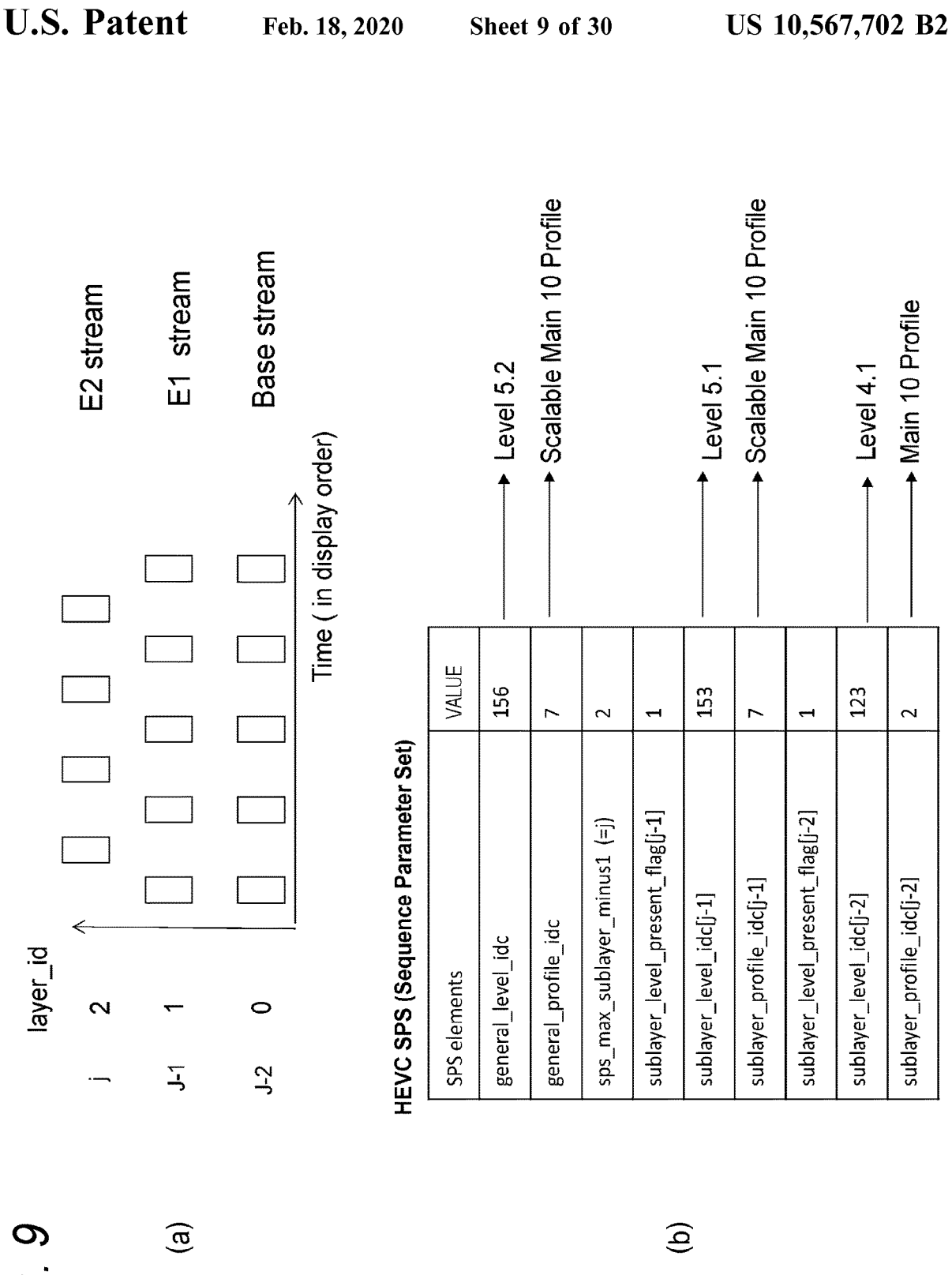

FIG. 10

| Syntax | No. of Bits | Format |
|---|---|---|
| video_scalability_SEI( ) { | | |
| video_scalability_id | 16 | uimsbf |
| video_scalability_length | 8 | uimsbf |
| temporal_scalable_flag | 1 | bslbf |
| spatial_scalable_flag | 1 | bslbf |
| if (spatial_scalable_flag ){ | | |
| scaling_ratio | 3 | uimsbf |
| reserved | 5 | 0x0 |
| } | | |
| else { | | |
| reserved | 6 | 0x0 |
| } | | |
| if (temporal_scalable_flag) { | | |
| picture_blending_flag | 1 | bslbf |
| if ( picture_blending_flag ){ | | |
| blend_coef_alpha_alternatte_picture | 3 | uimsbf |
| blend_coef_beta_alternate_picture | 3 | uimsbf |
| blend_coef_alpha_current_picture | 3 | uimsbf |
| blend_coef_beta_current_picture | 3 | uimsbf |
| reserved | 4 | 0x0 |
| } | | |
| else { | | |
| reserved | 15 | 0x0 |
| } | | |
| } | | |
| } | | |

FIG. 11

```
temporal_scalable_flag (1bit)     INDICATING WHETHER STREAM IS TEMPORALLY SCALABLE.
    '1'                           TEMPORALLY SCALABLE
    '0'                           NOT TEMPORALLY SCALABLE
spatial_scalable_flag (1bit)      INDICATING WHETHER STREAM IS SPATIALLY SCALABLE.
    '1'                           SPATIALLY SCALABLE
    '0'                           NOT SPATIALLY SCALABLE
scaling_ratio (3bits)             INDICATING SPATIALLY-SCALABLE RATIO (ENLARGEMENT RATIO IN 1D DIRECTION OF BASE AND EXTENDED).
    000                           reserved
    001                           TWICE
    010                           TRIPLE
    011                           FOURFOLD picture_blending_for_base_stream_flag (1bit)   INDICATING WHETHER PICTURE MIXING PROCESSING IS PERFORMED ON BASE STREAM
    '1'                           MIXING PROCESSING IS PERFORMED
    '0'                           MIXING PROCESSING IS NOT PERFORMED blend_coef_alpha_alternate_picture (8bits)   COEFFICIENT (p) TO BE MULTIPLIED BY PICTURE IN BASE LAYER
blend_coef_alpha_current_picture (8bits)     COEFFICIENT (r) TO BE MULTIPLIED BY CURRENT PICTURE (IN EXTENDED STREAM)
    0x0                           0
    0x1                           0.2
    0x2                           0.25
    0x3                           0.33
    0x4                           0.5
    0x5                           0.67
    0x6                           0.75
    0x7                           0.8
    0x8                           1 blend_coef_beta_alternate_picture (8bits)   COEFFICIENT (q) TO BE MULTIPLIED BY PICTURE IN EXTENDED LAYER
blend_coef_beta_current_picture (8bits)     COEFFICIENT (s) TO BE MULTIPLIED BY CURRENT PICTURE (IN EXTENDED STREAM)
    0x0                           0
    0x1                           0.2
    0x2                           0.25
    0x3                           0.33
    0x4                           0.5
    0x5                           0.67
    0x6                           0.75
    0x7                           0.8
    0x8                           1
```

FIG. 12

| Syntax | No. of Bits | Format |
|---|---|---|
| Video_scalability_information_descriptor( ) { | | |
| video_scalability_information_descriptor_tag | 8 | uimsbf |
| video_scalability_information_descriptor_length | 8 | uimsbf |
| temporal_scalable_flag | 1 | bslbf |
| spatial_scalable_flag | 1 | bslbf |
| if (spatial_scalable_flag ){ | | |
| scaling_ratio | 3 | uimsbf |
| reserved | 5 | 0x0 |
| } | | |
| else { | | |
| reserved | 6 | 0x0 |
| } | | |
| if (temporal_scalable_flag) { | | |
| picture_blending_flag | 1 | bslbf |
| if ( picture_blending_flag ){ | | |
| blend_coef_alpha_alternatte_picture | 3 | uimsbf |
| blend_coef_beta_alternate_picture | 3 | uimsbf |
| blend_coef_alpha_current_picture | 3 | uimsbf |
| blend_coef_beta_current_picture | 3 | uimsbf |
| reserved | 4 | 0x0 |
| } | | |
| else { | | |
| reserved | 15 | 0x0 |
| } | | |
| } | | |
| } | | |

FIG. 13

```
MPD

<AdaptationSet
  min,max framerate
  <Representation
    frameRate="60"
    codecs="hev1.A.L123,xx"
    id="tag0" >
    <BaseURL>video-basesubbitstream.mp4</BaseURL>
  </Representation>
  <Representation
    frameRate="60"
    codecs="hev1.B.L153,xx"
    id="tag1" >
    dependencyid= "tag0" >
    <BaseURL>video-e1subbitstream.mp4</BaseURL>
  </Representation>
  <Representation
    frameRate="120"
    codecs="hev1.C.L156,xx"
    id="tag2"
    dependencyid= "tag0,tag1" >
    <BaseURL>video-e2subset.mp4</BaseURL>
  </Representation>
</AdaptationSet>
```

FIG. 17

```
MPD
    <AdaptationSet>
        <Representation
            frameRate="60"
            codecs="hev1.A.L123,xx"
            id="tag0" >
            <BaseURL>video-basesubbitstream.mp4</BaseURL>
        </Representation>
        <Representation>
            <Subrepresentation
                frameRate="60"
                codecs="hev1.B.L153,xx"
                id="tag1" 
                dependencyid="tag0" >
            </Subrepresentation>
            <Subrepresentation
                frameRate="120"
                codecs="hev1.C.L156,xx"
                id="tag2"
                dependencyid="tag0,tag1" >
            </Subrepresentation>
            <BaseURL>video-enhancedsubstream.mp4</BaseURL>
        </Representation>
    </AdaptationSet>
```

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and specifically to a transmission device and the like configured to transmit ultra-high-definition image data with high frame rate.

BACKGROUND ART

It is considered that an image service (video service) for high-definition fixed receivers and an image service for middle-definition mobile receivers share streams in order to efficiently use a transmission bit rate in a reception environment in which a fixed receiver and a mobile receiver share the same transmission band, thereby further reducing the total bit rate than in a simulcast service in which a service for fixed receivers and a service for mobile receivers are separately provided. For example, Patent Document 1 describes that media encoding is performed in a scalable manner to generate a stream of a base layer for low-definition image service and a stream of an extended layer for high-definition image service, and a broadcast signal including them is transmitted.

On the other hand, in a case where smooth and sharp motions in sports scenes and the like are desired, a high-frame-rate video service with high shutter speed and high frame rate is required. In a case where a high-frame-rate service is provided, it is assumed that a moving image shot by a high-speed frame shutter of a camera is converted into a lower-frequency moving image sequence to be transmitted. An image by a high-speed frame shutter has an effect of improving motion blurring and realizing high-sharpness image quality, but has a problem of the strobing effect due to not all but only part of a high-frame-rate video displayed in a case where it is necessary to be compatible with a conventional normal-frame-rate receiver. The present applicants have proposed a technology for converting a material of an image shot by a high-speed frame shutter and displaying the converted material at certain image quality or more in a conventional receiver for normal-frame-rate decoding (see Patent Document 2).

CITATION LIST

Patent Document

Patent Document 1: Japanese Patent Application National Publication (Laid-Open) No. 2008-543142
Patent Document 2: International Publication No. 2015/076277

SUMMARY OF THE INVENTION

Problems to be Solved by the Invention

It is an object of the present technology to transmit ultra-high-definition image data with high frame rate thereby to preferably realize backward compatibility on the reception side.

Solutions to Problems

A concept of the present technology lies in a transmission device including:

an image processing unit configured to process ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;

an image encoding unit configured to generate a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format; and a transmission unit configured to transmit a container in a predetermined format including the base stream and the two or one extended video stream, in which the image processing unit performs a first-ratio mixing processing on the ultra-high-definition image data with high frame rate in units of two temporally-consecutive pictures to obtain first ultra-high-definition image data with base frame rate, performs a second-ratio mixing processing in units of the two temporally-consecutive pictures to obtain the image data in the second extension format, performs a downscale processing on the first image data to obtain the image data in the base format, and takes a difference between second ultra-high-definition image data with base frame rate obtained by performing an upscale processing on the image data in the base format and the first image data to obtain the image data in the first extension format.

According to the present technology, the image processing unit processes ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate.

Here, the image data in the second extension format is obtained by performing the second-ratio mixing processing on ultra-high-definition image data with high frame rate in units of two temporally-consecutive pictures. The image data in the base format is obtained by performing the downscale processing on first ultra-high-definition image data with base frame rate obtained by performing the first-ratio mixing processing in units of the two temporally-consecutive pictures. Further, the image data in the first extension format is obtained by taking a difference between second ultra-high-definition image data with base frame rate obtained by performing the upscale processing on the image data in the base format and the first image data.

The image encoding unit generates a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image of the image data in the second extension format. The transmission unit then transmits a container in a predetermined format including the base stream and the two or one extended video stream.

According to the present technology, the base video stream including the encoded image data of the image data in the base format for obtaining a high-definition image with base frame rate, and two or one extended video stream including the encoded image data of the image data in the first extension format for obtaining an ultra-high-definition image with base frame rate and the encoded image data of the image data in the second extension format for obtaining an ultra-high-definition image with high frame rate are transmitted. Thus, ultra-high-definition image data with high frame rate is transmitted with preferable backward compatibility on the reception side.

For example, a receiver having a decode capability to process high-definition image data with base frame rate can process only the base video stream and can display a high-definition image with base frame rate. Further, for example, a receiver having a decode capability to process ultra-high-definition image data with base frame rate can process both the base video stream and the extended streams and can display an ultra-high-definition image with base frame rate. Further, for example, a receiver having a decode capability to process ultra-high-definition image data with high frame rate can process both the base video stream and the extended streams and can display an ultra-high-definition image with high frame rate.

Further, according to the present technology, the image data in the base format is obtained by performing the downscale processing on the first ultra-high-definition image data with base frame rate obtained by performing the first-ratio mixing processing on ultra-high-definition image data with high frame rate in units of two temporally-consecutive pictures. Thus, the high-definition image with base frame rate displayed by processing only the base video stream is restricted in the strobing effect to be a smooth image.

Additionally, according to the present technology, for example, there may be further provided an information insertion unit configured to insert identification information indicating being spatially scalable into the encoded image data of the image data in the first extension format and/or a container position corresponding to the encoded image data. With the inserted identification information, the reception side can easily recognize that the image data in the first extension format is for obtaining ultra-high-definition image data.

In this case, for example, the information insertion unit may further insert information indicating a spatially-scalable ratio. The reception side can appropriately perform the spatially-scalable processing by use of the information indicating a spatially-scalable ratio, thereby preferably obtaining ultra-high-definition image data.

Further, according to the present technology, for example, there may be further provided an information insertion unit configured to insert identification information indicating being temporally scalable into the encoded image data of the image data in the second extension format and/or a container position corresponding to the encoded image data. With the inserted identification information, the reception side can easily recognize that the image data in the second extension format is for obtaining image data with high frame rate.

In this case, for example, the information insertion unit may further insert identification information indicating that the image data in the base format is obtained by performing the mixing processing. With the inserted identification information, the reception side can easily recognize that the image data in the base format is obtained by performing the mixing processing.

Further, in this case, for example, the information insertion unit may further insert ratio information in the mixing processing (information regarding the first ratio and information regarding the second ratio). The reception side can appropriately perform the temporally-scalable processing by use of the ratio information in the mixing processing, thereby preferably obtaining image data with high frame rate.

Further, according to the present technology, for example, there is further provided a transmission unit configured to transmit a meta-file having meta-information for causing a reception device to obtain the base video stream and two or one extended video stream, and information indicating a correspondence of scalability may be inserted into the meta-file. The reception side can easily recognize the correspondence of scalability from the information indicating a correspondence of scalability inserted into the meta-file, and can obtain and efficiently process only a required stream or encoded imaged data.

Further, other concept of the present technology is a reception device including a reception unit configured to receive a container in a predetermined format including a base video stream having encoded image data of image data in a base format for obtaining a high-definition image with base frame rate, and two extended video streams having encoded image data of image data in a first extension format for obtaining ultra-high-definition image data with base frame rate and encoded image data of image data in a second extension format for obtaining an ultra-high-definition image with high frame rate, respectively, or one extended video stream having both the encoded image data of the image data in the first extension format and the encoded image data of the image data in the second extension format, in which the image data in the second extension format is obtained by performing a second-ratio mixing processing on ultra-high-definition image data with high frame rate in units of two temporally-consecutive pictures, the image data in the base format is obtained by performing a downscale processing on first ultra-high-definition image data with base frame rate obtained by performing a first-ratio mixing processing in units of the two temporally-consecutive pictures, the image data in the first extension format is obtained by taking a difference between second ultra-high-definition image data with base frame rate obtained by performing an upscale processing on the image data in the base format and the first data, and the reception device further includes a processing unit configured to process only the base video stream to obtain high-definition image data with base frame rate or to process both the base video stream and the extended video streams to obtain ultra-high-definition image data with base frame rate or ultra-high-definition image data with high frame rate.

According to the present technology, the reception unit receives a container in a predetermined format including the base video stream and two or one extended video stream. The base video stream has the encoded image data of the image data in the base format for obtaining a high-definition image with base frame rate. The two or one extended video stream has the encoded image data of the image data in the first extension format for obtaining an ultra-high-definition image with base frame rate and the encoded image data of the image data in the second extension format for obtaining an ultra-high-definition image with high frame rate.

Here, the image data in the second extension format is obtained by performing the second-ratio mixing processing on ultra-high-definition image data with high frame rate in units of two temporally-consecutive pictures. The image data in the base format is obtained by performing the downscale processing on first ultra-high-definition image data with base frame rate obtained by performing the first-ratio mixing processing in units of the two temporally-consecutive pictures. The image data in the first extension format is obtained by taking a difference between second ultra-high-definition image data with base frame rate obtained by performing the upscale processing on the image data in the base format and the first image data.

The processing unit processes only the base video stream to obtain high-definition image data with base frame rate, or processes both the base video stream and the extended video streams to obtain ultra-high-definition image data with base frame rate or ultra-high-definition image data with high frame rate.

As described above, according to the present technology, only the base video stream including the encoded image data of the image data in the base format for obtaining a high-definition image with base frame rate is processed to obtain high-definition image data with base frame rate. That is, a receiver having a decode capability to process high-definition image data with base frame rate can process only the base video stream and can display a high-definition image with base frame rate, thereby realizing backward compatibility.

Here, the image data in the base format is obtained by performing the downscale processing on the first ultra-high-definition image data with base frame rate obtained by performing the first-ratio mixing processing on ultra-high-definition image data with high frame rate in units of two temporally-consecutive pictures. Thus, a high-definition image with base frame rate displayed by processing only the base video stream is restricted in the strobing effect to be a smooth image.

Further, both the base video stream and the extended video streams are processed to obtain ultra-high-definition image data with base frame rate or ultra-high-definition image data with high frame rate. That is, a receiver having a decode capability to process ultra-high-definition image data with base frame rate can process both the base video stream and the extended streams and can display an ultra-high-definition image with base frame rate. Further, a receiver having a decode capability to process ultra-high-definition image data with high frame rate can process both the base video stream and the extended streams and can display an ultra-high-definition image with high frame rate.

Additionally, according to the present technology, for example, information indicating a spatially-scalable ratio is inserted into the encoded image data of the image data in the first extension format and/or a container position corresponding to the encoded image data, and the processing unit may use the inserted information indicating a spatially-scalable ratio to obtain ultra-high-definition image data with base frame rate. In this case, the spatially-scalable processing can be appropriately performed, thereby preferably obtaining ultra-high-definition image data with base frame rate.

Further, according to the present technology, for example, information indicating a spatially-scalable ratio is inserted into the encoded image data of the image data in the first extension format and/or a container position corresponding to the encoded image data, information regarding the first ratio and information regarding the second ratio are inserted into the encoded image data of the image data in the second extension format and/or a container position corresponding to the encoded image data, and the processing unit may use the inserted information indicating a spatially-scalable ratio as well as the information regarding the first ratio and the information regarding the second ratio to obtain ultra-high-definition image data with high frame rate. In this case, spatially-scalable and temporally-scalable processings can be appropriately performed, thereby preferably obtaining ultra-high-definition image rate with high frame rate.

Effects of the Invention

According to the present technology, it is possible to transmit ultra-high-definition image data with high frame rate thereby to preferably realize backward compatibility on the reception side. Additionally, the effects described in the present specification are merely exemplary and are not restrictive, and an additional effect may be obtained.

BRIEF DESCRIPTION OF DRAWINGS

FIG. 9 is a diagram illustrating exemplary elements in SPS (VPS).

FIG. 10 is a diagram illustrating an exemplary structure of video scalability SEI.

FIG. 11 is a diagram illustrating contents of main information in the exemplary structure of video scalability SEI.

FIG. 12 is a diagram illustrating an exemplary structure of a video scalability information descriptor.

FIG. 13 is a diagram illustrating an exemplary description of a MPD file in transmitting three stream configurations.

FIG. 17 is a diagram illustrating an exemplary description of a MPD file in transmitting two stream configurations.

MODE FOR CARRYING OUT THE INVENTION

A mode for carrying out the invention (which will be denoted as "embodiment" below) will be described below. Additionally, the description will be made in the following order.

1. Embodiment
2. Variant

<1. Embodiment>

[Outline of MPEG-DASH-based Stream Distribution System]

An outline of a MPEG-DASH-based stream distribution system to which the present technology is applicable will be first described.

FIG. 1(a) illustrates an exemplary configuration of a MPEG-DASH-based stream distribution system 30A. In the exemplary configuration, a media stream and a MPD file are transmitted via a communication network transmission path (communication transmission path). The stream distribution system 30A is configured such that N service receivers 33-1, 33-2, . . . , and 33-N are connected to a DASH stream file server 31 and a DASH MPD server 32 via a content delivery network (CDN) 34.

The DASH stream file server 31 generates a stream segment in DASH specification (which will be denoted as "DASH segment" as needed) on the basis of media data (such as video data, audio data, or subtitles data) of predetermined contents, and sends a segment in response to a HTTP request from a service receiver. The DASH stream file server 31 may be a streaming-dedicated server, or may be shared with a web server.

Further, the DASH stream file server 31 transmits a segment of a stream to a request source receiver via the CDN 34 in response to the request of the segment of the predetermined stream sent from a service receiver 33 (33-1, 33-2, . . . , and 33-N) via the CDN 34. In this case, the service receiver 33 selects a stream with optimum rate and makes a request depending on a state of a network environment in which a client is present with reference to the values of rates described in a media presentation description (MPD) file.

The DASH MPD server 32 is directed for generating a MPD file in order to obtain a DASH segment generated in the DASH stream file server 31. A MPD file is generated on the basis of contents meta-data from a content management server (not illustrated) and a segment address (url) generated in the DASH stream file server 31. Additionally, the DASH stream file server 31 and the DASH MPD server 32 may be physically the same.

An element Representation is utilized per stream of video, audio, or the like to describe each attribute in the MPD format. For example, the MPD file describes the respective rates of divided Representation per multiple video data streams with different rates. The service receiver 33 can select an optimum stream depending on a state of a network environment in which the service receiver 33 is present as described above with reference to the values of the rates.

Figure 1:
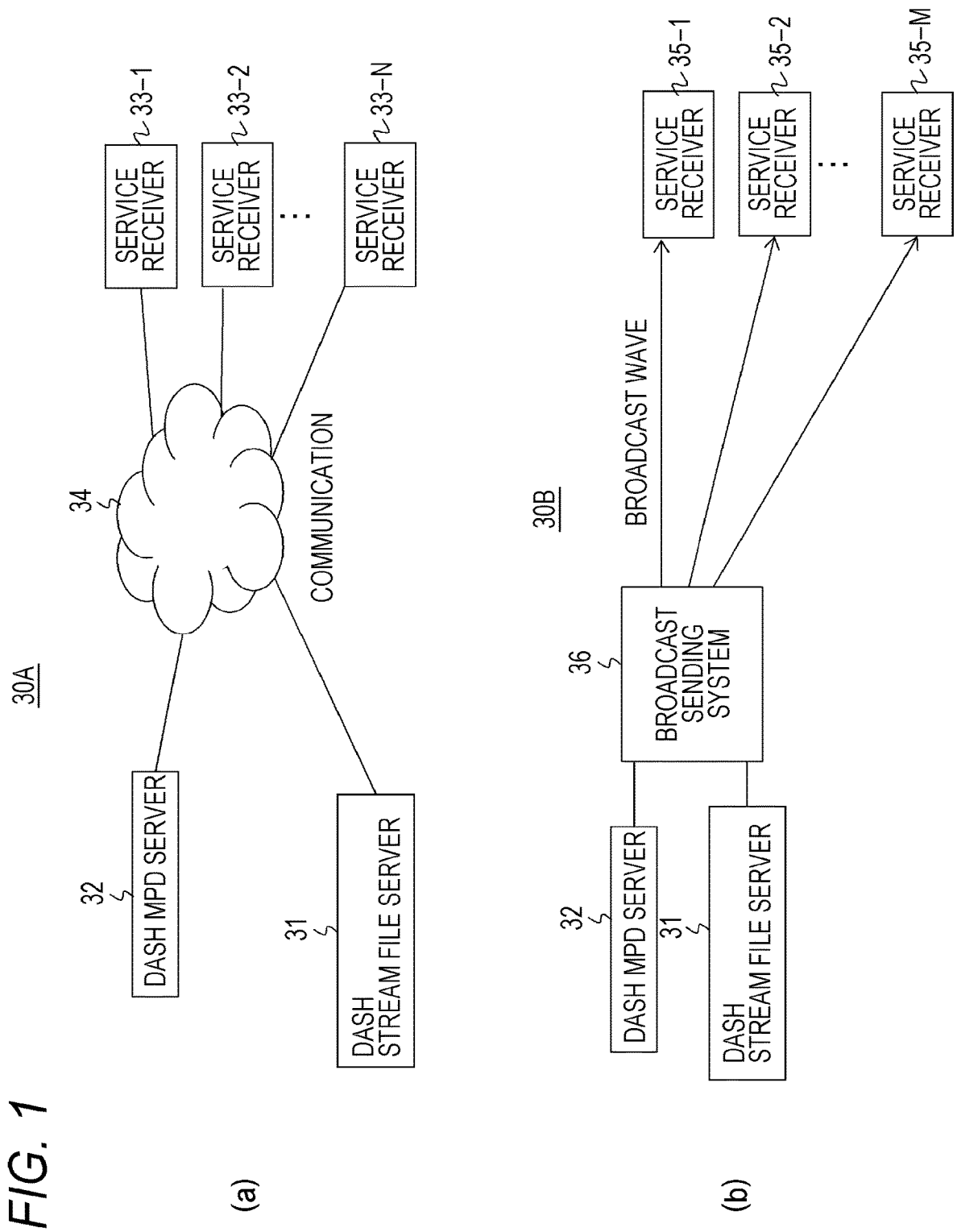
FIG. 1 is a block diagram illustrating exemplary configurations of a MPEG-DASH-based stream distribution system.

FIG. 1 (b) illustrates an exemplary configuration of a MPEG-DASH-based stream distribution system 30B. In the exemplary configuration, a media stream and a MPD file are transmitted via a RF transmission path (broadcast transmission path). The stream distribution system 30B is configured of a broadcast sending system 36 connected with the DASH stream file server 31 and the DASH MPD server 32, and M service receivers 35-1, 35-2, . . . , and 35-M.

In the stream distribution system 30B, the broadcast sending system 36 transmits a stream segment (DASH segment) in DASH specification generated in the DASH stream file server 31 and a MPD file generated in the DASH MPD server 32 on a broadcast wave.

Figure 2:
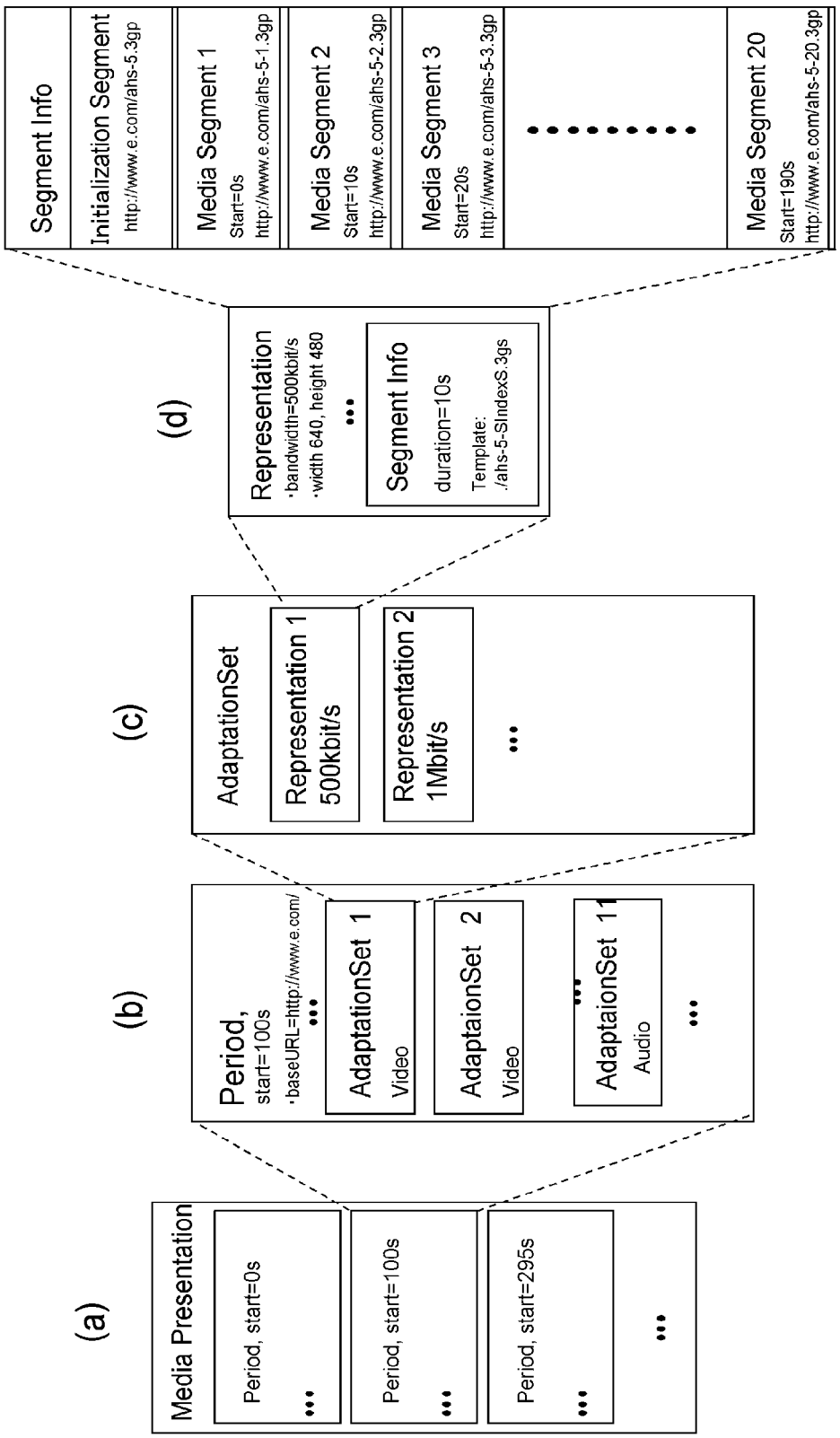
FIG. 2 is a diagram illustrating exemplary relationships among structures arranged in a MPD file in a hierarchy manner.

FIG. 2 illustrates exemplary relationships among structures arranged in a MPD file in a hierarchy manner. As illustrated in FIG. 2(a), a plurality of periods delimited at time intervals is present in media presentation as entire MPD file. For example, the first period is assumed to start at 0 seconds, a next period is assumed to start at 100 seconds, and the like.

As illustrated in FIG. 2 (b), a plurality of adaptation sets (AdaptationSet) is present in the periods. Each adaptation set depends on a difference in media type such as video or audio, a difference in language at the same media type, a difference in viewpoint, or the like. As illustrated in FIG. 2(c), a plurality of representations is present in an adaptation set. Each representation depends on a stream attribute such as difference in rate.

As illustrated in FIG. 2(d), representation includes segment Info. An initialization segment and a plurality of media segments each describing information per segment as further-delimited period are present in segment Info as illustrated in FIG. 2 (e). Address (url) information and the like for actually obtaining segment data of video, audio, or the like are present in a media segment.

Additionally, stream switching can be freely performed among a plurality of representations included in an adaptation set. Thereby, a stream with optimum rate can be selected depending on a state of a network environment on the reception side, and seamless video distribution is enabled.

[Exemplary Configuration of Transmission/Reception System]

Figure 3:
FIG. 3 is a block diagram illustrating an exemplary configuration of a transmission/reception system according to an embodiment.

FIG. 3 illustrates an exemplary configuration of a transmission/reception system 10 according to an embodiment. The transmission/reception system 10 is configured of a service transmission system 100 and a service receiver 200. In the transmission/reception system 10, the service transmission system 100 corresponds to the DASH stream file server 31 and the DASH MPD server 32 in the stream distribution system 30A illustrated in FIG. 1(a). Further, in the transmission/reception system 10, the service transmission system 100 corresponds to the DASH stream file server 31, the DASH MPD server 32, and the broadcast sending system 36 in the stream distribution system 30B illustrated in FIG. 1 (b).

Further, in the transmission/reception system 10, the service receiver 200 corresponds to the service receivers 33 (33-1, 33-2, . . . , 33-N) in the stream distribution system 30A illustrated in FIG. 1(a). Further, in the transmission/reception system 10, the service receiver 200 corresponds to the service receivers 35 (35-1, 35-2, . . . , 35-M) in the stream distribution system 30B illustrated in FIG. 1(b).

The service transmission system 100 transmits DASH/MP4, or MP4 including a MPD file as meta-file and a media stream (media segment) of video, audio, or the like via the communication network transmission path (see FIG. 1 (a)) or the RF transmission path (see FIG. 1 (b)).

According to the embodiment, the media streams are a base video stream and two or one extended video stream obtained by processing ultra-high-definition (UHD) image data (moving image data) with high frame rate (HFR). The ultra-high-definition image data with high frame rate is 4K/8K image data of 120 fps, for example.

The base video stream has encoded image data of image data in a base format for obtaining a high-definition image with base frame rate (normal frame rate). The two or one extended video stream has encoded image data of image data in a first extension format for obtaining an ultra-high-definition image with base frame rate and encoded image data of image data in a second extension format for obtaining an ultra-high-definition image with high frame rate.

Here, the image data in the second extension format is obtained by performing a second-ratio mixing processing on ultra-high-definition image data with high frame rate in units of two temporally-consecutive pictures. The image data in the base format is obtained by performing a downscale processing on first ultra-high-definition image data with base frame rate obtained by performing a first-ratio mixing processing in units of the two temporally-consecutive pictures. The image data in the first extension format is obtained by taking a difference between second ultra-high-definition image data with base frame rate obtained by performing an upscale processing on the image data in the base format and the first image data.

Figure 4:
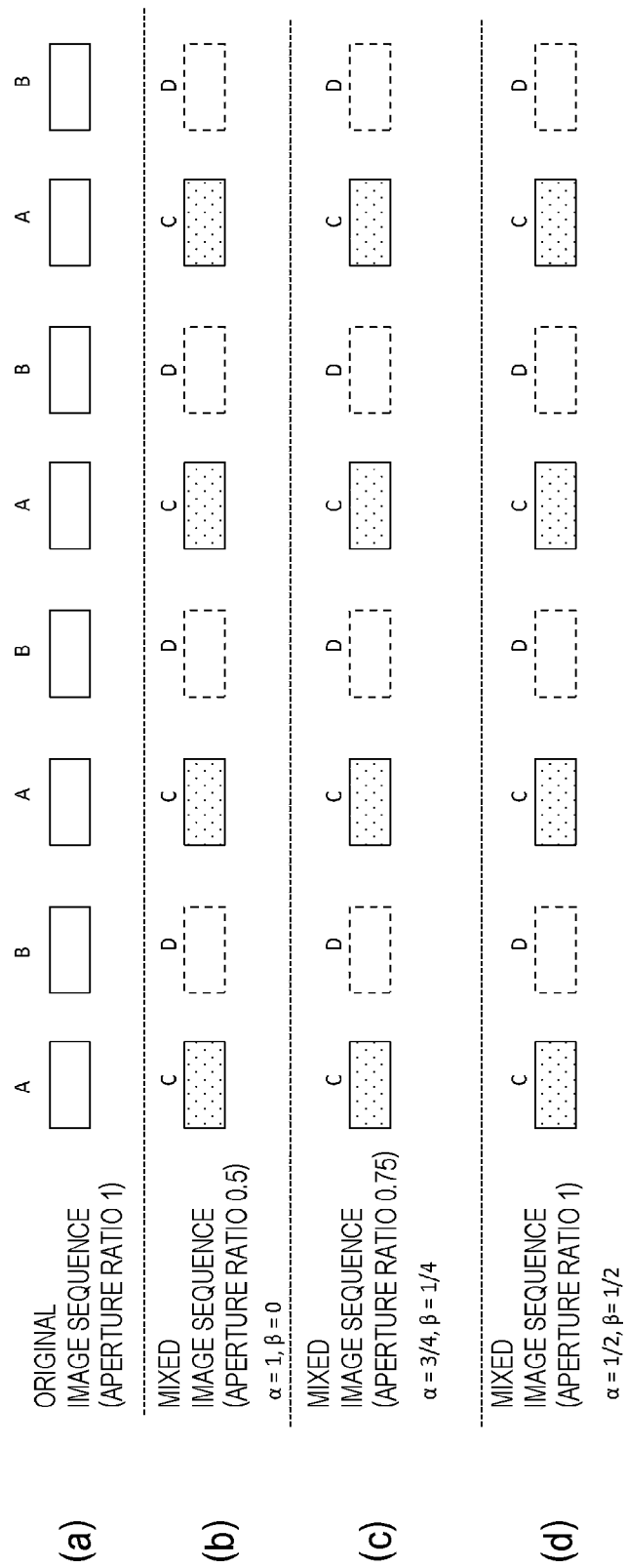
FIG. 4 is a diagram for explaining a shutter aperture ratio changing depending on a mix ratio.

Here, the image data with high frame rate is assumed as an original image sequence (high-speed shutter image sequence) as illustrated in FIG. 4 (a). In the Figure, "A" and "B" indicate image data of the first picture and image data of the second picture in units of two temporally-consecutive pictures, respectively. The shutter aperture ratio of the original image sequence is 1 (100%). Though not illustrated, the shutter aperture ratio of the image sequence of "A" or "B" simply extracted from the image data with high frame rate is ½ (50%).

To the contrary, as illustrated in FIGS. 4(b) to 4(d), the shutter aperture ratio of a mixed image sequence obtained by performing a mixing processing in units of two temporally-consecutive pictures is between ½ (50%) and 1 (100%). In the Figures, "C" indicates image data with base frame rate obtained by performing the first-ratio mixing processing in units of two pictures, and "D" indicates high-frame-rate image data of an extended frame obtained by performing the second-ratio mixing processing in units of two pictures. Here, the mixed image sequence of "C" is of interest.

For example, as illustrated in FIG. 4(b), when a coefficient α of the first picture is 1 and a coefficient β of the second picture is 0, the shutter aperture ratio of the mixed image sequence is ½ (50%). Further, for example, as illustrated in FIG. 4(c), when the coefficient α of the first picture is ¾ and the coefficient β of the second picture is ¼, the shutter aperture ratio of the mixed image sequence is ¾ (75%). Furthermore, for example, as illustrated in FIG. 4 (d), when the coefficient α of the first picture is ½ and the coefficient β of the second picture is ½, the shutter aperture ratio of the mixed image sequence is 1 (100%).

Identification information indicating being spatially scalable and information indicating a spatially-scalable ratio are inserted into one of or both, both according to the embodiment, the encoded image data of the image data in the first extension format and a container position corresponding to the encoded image data. According to the embodiment, a SEI NAL unit having the information is inserted into the encoded image data (access units) of the image data in the first extension format, and a descriptor having the information is inserted into a box "moof" corresponding to the image data in the first extension format in MP4. The reception side can easily recognize that the image data in the first extension format is spatially scalable, and the spatially-scalable ratio.

Identification information indicating being temporally scalable, identification information indicating that the image data in the base format is obtained by performing the mixing processing, and information indicating a mix ratio (the first and second ratios) are inserted into one of or both, both according to the embodiment, the encoded image data of the image data in the second extension format and a container position corresponding to the encoded image data.

According to the embodiment, a SEI NAL unit having the information is inserted into the encoded image data (access units) of the image data in the second extension format, and a descriptor having the information is inserted into the box "moof" corresponding to the image data in the second extension formation in MP4. The reception side can easily recognize that the image data in the second extension format is temporally scalable, that the image data in the base format is obtained by performing the mixing processing, and the mix ratio (the first and second ratios).

Further, according to the embodiment, information indicating a correspondence of scalability is inserted into the MPD file. That is, it is indicated that ultra-high-definition image data with base frame rate is obtained by extension using the image data in the first extension format onto the image data in the base format. Further, it is indicated that ultra-high-definition image data with high frame rate is obtained by extension using the image data in the first and second extension formats onto the image data in the base format. The reception side can easily recognize a correspondence of scalability, and can obtain and efficiently process only a required stream or encoded image data.

The service receiver 200 receives the MP4 sent from the service transmission system 100 via the communication network transmission path (see FIG. 1(a)) or the RF transmission path (see FIG. 1 (b)). In a case where the service receiver 200 is a receiver having a decode capability to process high-definition image data with base frame rate, it processes only the base video stream, obtains high-definition image data with base frame rate, and reproduces the image.

Further, in a case where the service receiver 200 is a receiver having a decode capability to process ultra-high-definition image data with base frame rate, it processes both the base video stream and the extended stream, obtains ultra-high-definition image data with base frame rate, and reproduces the image. Further, in a case where the service receiver 200 is a receiver having a decode capability to process ultra-high-definition image data with high frame rate, it processes both the base video stream and the extended stream, obtains ultra-high-definition image data with high frame rate, and reproduces the image.

In a case where the service receiver 200 performs a spatially-scalable processing using the image data in the first extension format, it uses the information indicating a spatially-scalable ratio inserted into the encoded image data of the image data in the first extension format or the container position corresponding to the encoded image data. Thereby, the service receiver 200 can appropriately perform the spatially-scalable processing.

Further, in a case where the service receiver 200 performs a temporally-scalable processing using the image data in the second extension format, it uses the information indicating a mix ratio (the first and second ratios) inserted into the encoded image data of the image data in the second extension format and the container position corresponding to the encoded image data. Thereby, the service receiver 200 can appropriately perform the temporally-scalable processing.

Figure 5:
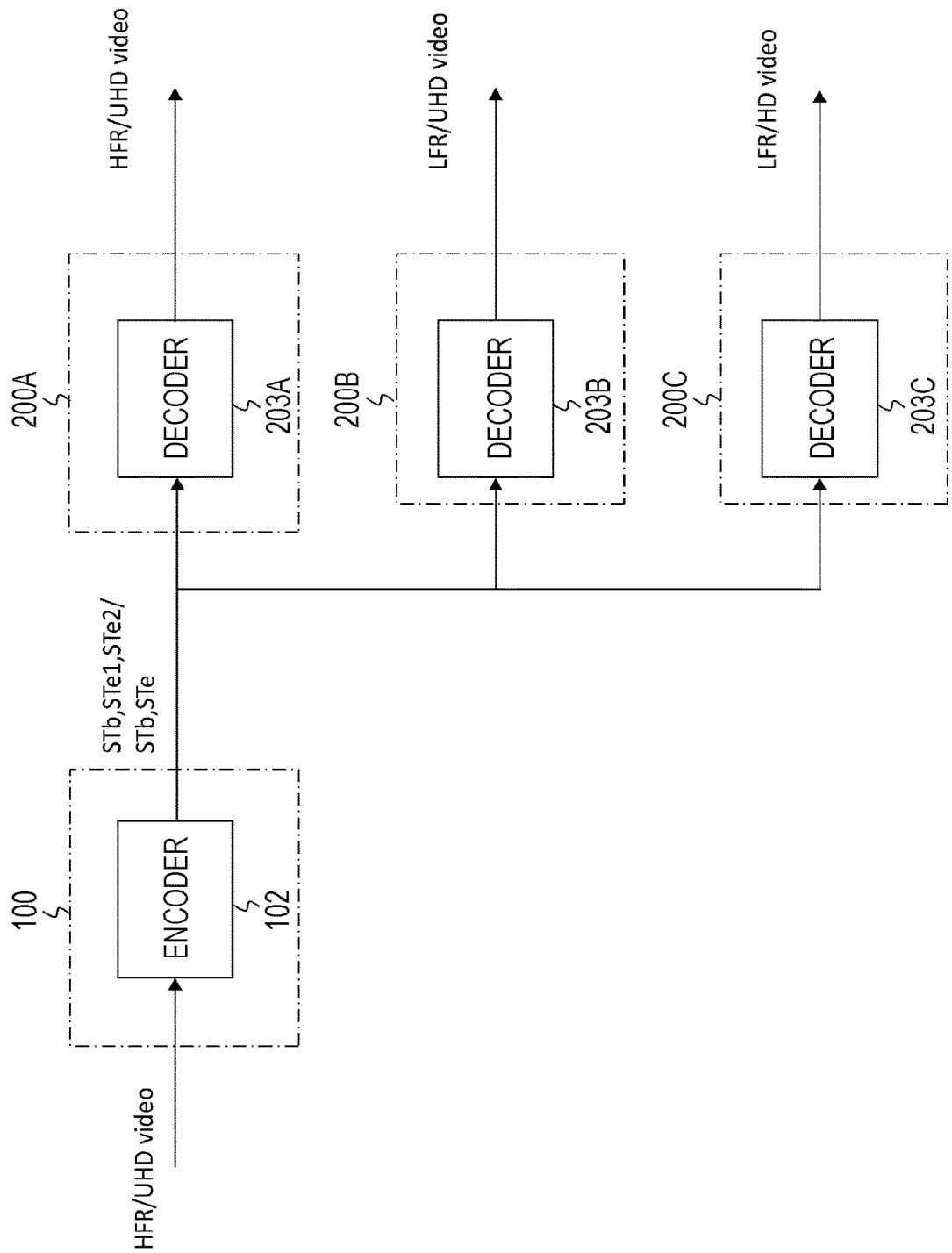
FIG. 5 is a diagram illustrating an outline of the processings in a service transmission system and a service receiver.

FIG. 5 illustrates an outline of the processings in the service transmission system 100 and the service receiver 200. Ultra-high-definition (UHD) image data with high frame rate (HFR) "HFR/UHD video" is input into the service transmission system 100. In the service transmission system 100, the encoder 100 processes the image data "HFR/UHD video", and obtains and transmits a base video stream STb and two extended video streams STe1 and STe2, or a base video stream STb and one extended video stream STe.

Here, the base video stream STb has the encoded image data of the image data in the base format for obtaining a high-definition (HD) image with base frame rate (LFR). The extended video stream STe1 has the encoded image dada of the image data in the first extension format for obtaining an ultra-high-definition (UHD) image with base frame rate (LFR). The extended video stream STe2 has the encoded image data of the image data in the second extension format for obtaining an ultra-high-definition (UHD) image with high frame rate (HFR) The extended video stream STe has the encoded image data of the image data in the first extension format and the encoded image data of the image data in the second extension format.

In a service receiver 200A having the decode capability to process ultra-high-definition image data with high frame rate, a decoder 203A processes the base video stream STb and the extended video streams STe1 and STe2, or the base video stream STb and the extended video stream STe, obtains ultra-high-definition image data with high frame rate "HFR/UHD video", and reproduces the image.

Further, in a service receiver 200B having the decode capability to process ultra-high-definition image data with base frame rate, a decoder 203B processes the base video stream STb and the extended video stream STe1, or the base video stream STb and the extended video stream STe, obtains ultra-high-definition image data with base frame rate "LFR/UHD video", and reproduces the image. Further, in a service receiver 200C having the decode capability to process high-definition image data with base frame rate, a decoder 203C processes the base video stream STb, obtains high-definition image data with base frame rate "LFR/HD video", and reproduces the image.

Figure 6:
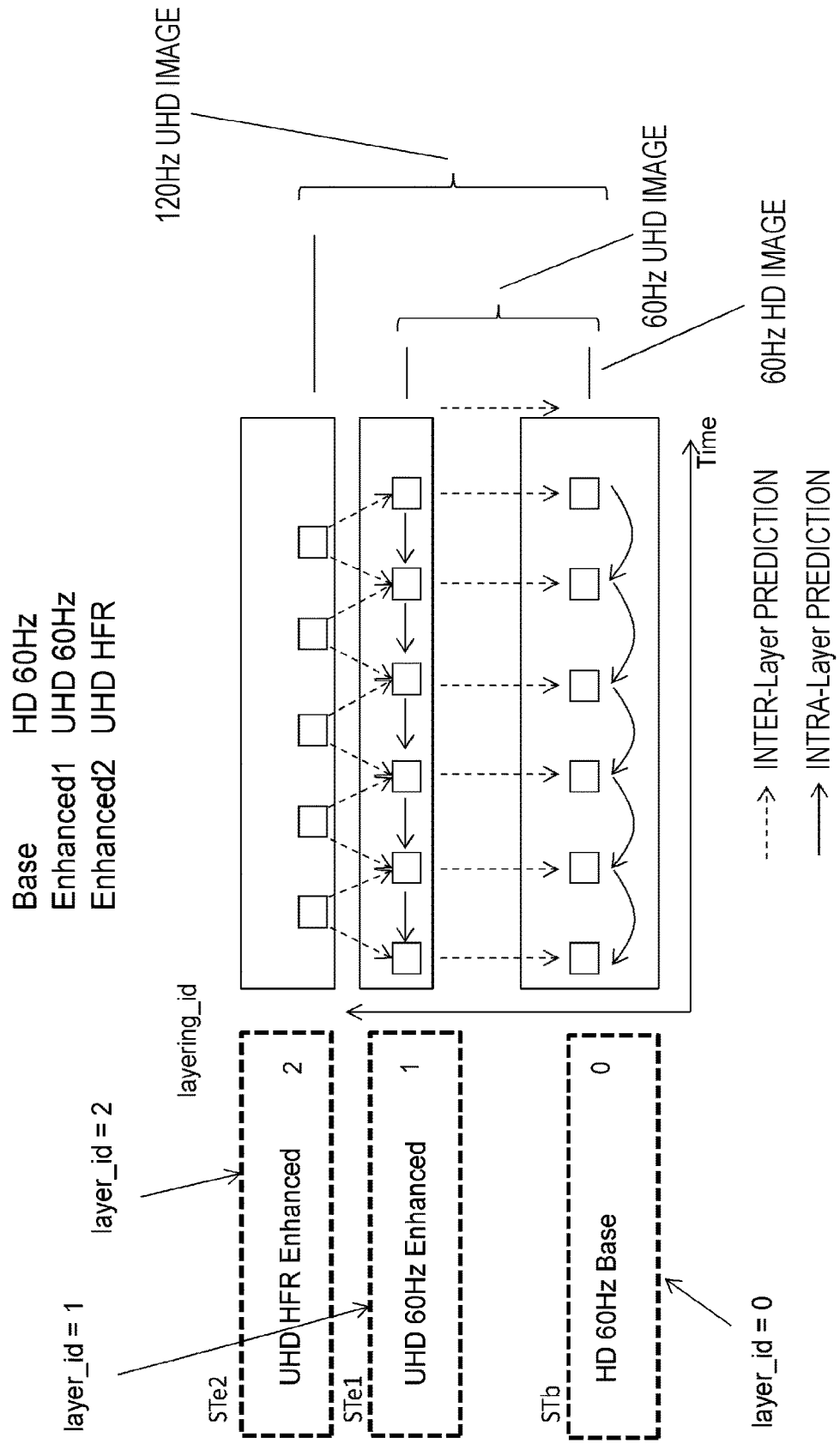
FIG. 6 is a diagram illustrating an exemplary stream configuration in transmitting three stream configurations including a base video stream Stb and extended streams STe1 and STe2.

FIG. 6 illustrates an exemplary stream configuration in transmitting three stream configurations including the base video stream STb and the extended video streams STe1 and STe2. The illustrated example indicates a case with a high frame rate of 120 Hz. The horizontal axis indicates a picture order of composition (POC), where the left side indicates an earlier display time and the right side indicates a later display time. Each rectangular frame indicates a picture and an arrow indicates an exemplary picture reference relationship in a predictive encoding processing. For both inter-layer and intra-layer predictions, a current picture changes per block, and a direction of prediction and the number of references are not limited to the illustrated example.

A sequence of the image data "HD 60 Hz Base" in the base format included in the base video stream STb with a layering ID (layering_id) of "0" is present at the lowermost stage. The layer ID (Layer_id) of the image data "HD 60 Hz Base" is "0".

A sequence of the image data "UHD 60 Hz Enhanced" in the first extension format included in the extended video stream STe1 with a layering ID (layering_id) of "1" is present thereon. "UHD 60 Hz Enhanced" is scalability in the spatial direction relative to the image data "HD 60 Hz Base". The layer ID (Layer_id) of the image data "UHD 60 Hz Enhanced" is "1".

A sequence of the image data "UHD HFR Enhanced" in the second extension format included in the extended video stream STe2 with a layering ID (layering_id) of "2" is present thereon. "UHD HFR Enhanced" is scalability in the temporal direction relative to the image data "UHD 60 Hz Enhanced". The layer ID (Layer_id) of the image data "UHD HFR Enhanced" is "2".

A high-definition (HD) image (60 Hz HD image) with base frame rate can be reproduced on the basis of the image data "HD 60 Hz Base" in the base format. Further, an ultra-high-definition (UHD) image (60 Hz UHD image) with base frame rate can be reproduced on the basis of the image data "HD 60 Hz Base" in the base format and the image data "UHD 60 Hz Enhanced" in the first extension format. Further, an ultra-high-definition (UHD) image (120 Hz UHD image) with high frame rate can be reproduced on the basis of the image data "HD 60 Hz Base" in the base format, the image data "UHD 60 Hz Enhanced" in the first extension format, and the image data "UHD HFR Enhanced" in the second extension format.

Figure 7:
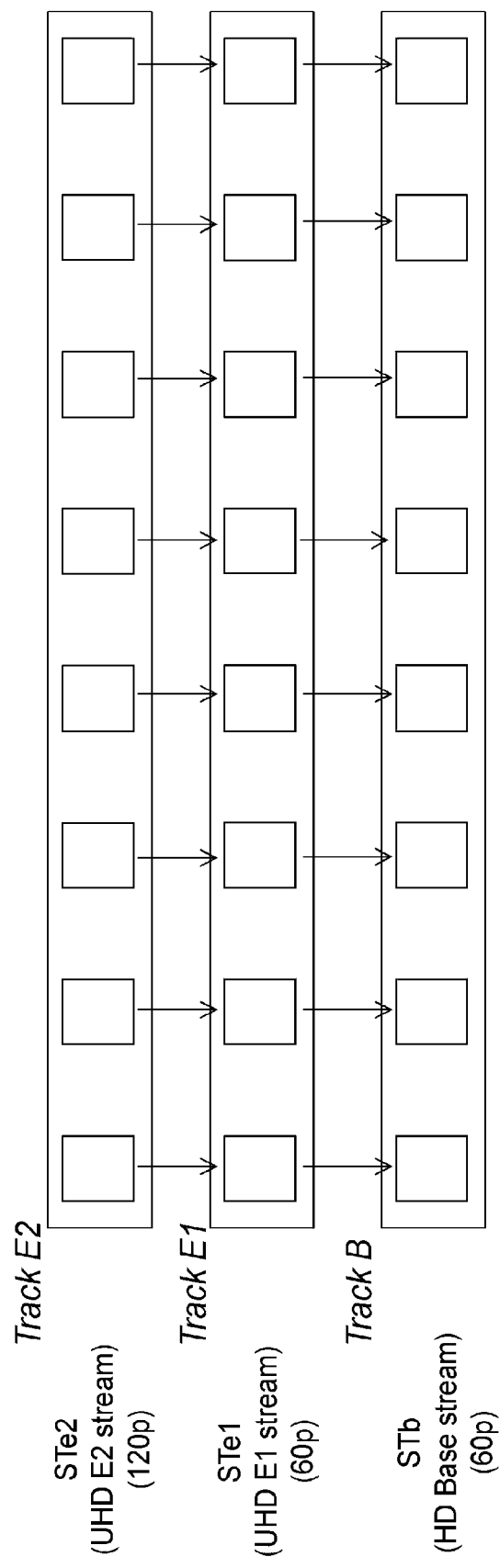
FIG. 7 is a diagram illustrating a DASH/MP4 Track configuration in transmitting three stream configurations.

FIG. 7 illustrates a DASH/MP4 Track configuration in transmitting three stream configurations. In this case, a Track B corresponding to the base video stream STb (HD Base stream), a Track E1 corresponding to the extended video stream (UHD E1 stream), and a Track E2 corresponding to the extended video stream (UHD E2 stream) are present.

Each rectangular frame indicates a picture and an arrow indicates a correspondence of scalability. That is, an ultra-high-definition (UHD) image with base frame rate, or the image data of the 60 Hz UHD image is obtained by spatially-scalable extension using the image data in the first extension format included in the Track E1 onto the image data in the base format included in the Track B. Further, an ultra-high-definition (UHD) image with high frame rate, or the image data of the 120 Hz UHD image is obtained by spatially-scalable and temporally-scalable extensions using the image data in the first extension format included in the Track E1 and the image data in the second extension format included in the Track E2 onto the image data in the base format included in the Track B.

Figure 8:
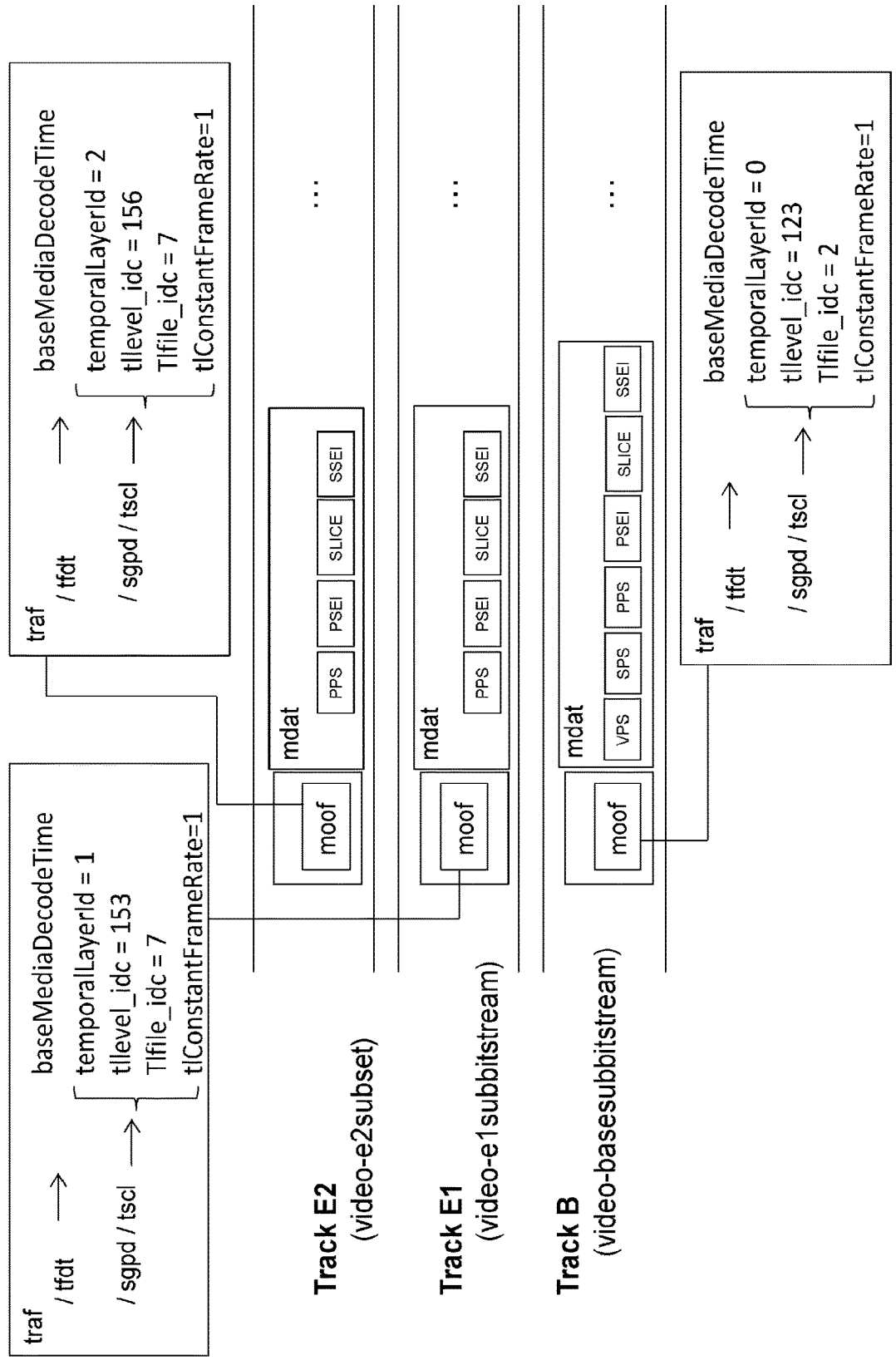
FIG. 8 is a diagram illustrating an exemplary configuration of a MP4 stream (file) including each Track data of Track B, Track E1, and Track E2.

FIG. 8 illustrates an exemplary configuration of a MP4 stream (file) including each Track data of the Track B, the Track E1, and the Track E2. The illustrated example is a case of fragmented MP4. A predetermined number of movie fragments each configured of the box "moof" including control information and a box "mdat" including media data are arranged in the MP4 stream. Fragmented pieces of Track data are included in the box "mdat", and thus the control information included in the box "moof" is control information regarding the pieces. Additionally, an inter-Track predictive reference relationship, which will not be described in detail, is defined by arranging packets of NAL type called extractor per access unit in a Track.

The encoded image data (access units) of the image data in the base format for a predetermined number of pictures such as 1GOP is arranged in the box "mdat" in each movie fragment in the MP4 stream "video-base sub bit stream" corresponding to the Track B. Here, each access unit is configured of NAL units such as "VPS", "SPS", "PPS", "PSEI", "SLICE", and "SSEI". Additionally, "VPS" and "SPS" are inserted into the head picture in GOP, for example.

FIG. 9 (b) illustrates exemplary elements in SPS (VPS) The example is that the base video stream STb (HD Base stream), the extended video stream (UHD E1 stream), and the extended video stream (UHD E2 stream) are configured as illustrated in FIG. 9(a). It is indicated that the value of "general_level_idc" is assumed at "156" and the entire stream level (complexity in pixel rate in scalable encoding) of the extended video stream STe2, the extended video stream STe1, and the base video stream Stb is "level 5.2". Further, it is indicated that the value of "general_profile_idc" is assumed at "7" and the entire stream profile (type of scalable encoding) is "Scalable Main 10 Profile".

Further, "sublayer_level_present_flag[j−1]" is assumed at "1", the value of "sublayer_level_idc[j−1]" is assumed at "153," and "sublayer_profile_idc[j−1]" is assumed at "7". Thereby, it is indicated that the entire stream level of the extended video stream STe1 and the base video stream STb is "level 5.1" and it is indicated that the profile thereof is "Scalable Main 10 Profile".

Further, "sublayer_level_present_flag[j−2]" is assumed at "1", the value of "sublayer_level_idc[j−2]" is assumed at "123", and "sublayer_profile_idc[j−1]" is assumed at "2". Thereby, it is indicated that the level of the base video stream STb is "level 4.1" and it is indicated that the profile thereof is "Main 10 Profile".

Returning to FIG. 8, a box "traf" is present in the box "moof" and a box "tfdt" is present in the box "traf" in each movie fragment in the MP4 stream "video-base sub bit stream" corresponding to the Track B. A decoder time "baseMediaDecodeTime" of the first access unit after the box "moof" is described in the box "tfdt".

Further, the box "tfdt" is present in the box "moof", a box "sgpd" is present in the box "tfdt", and a box "tscl" is present in the box "sgpd". Four parameters "temporalLayerId", "tllevel_idc", "Tlprofile", and "-tlConstantFrameRate" are described in the box "tscl". "temporalLayerId" indicates a temporal ID (temporal_id). "tlConstantFrameRate" is assumed at "1", which indicates that the frame rate is constant.

"tllevel_idc" indicates a level of the base video stream STb, and is matched with the element "sublayer_level_idc[j−2]" in SPS (VPS). Here, "tllevel_idc" is assumed at "123". "Tlprofile" indicates a profile of the base video stream STb, and is matched with the element "sublayer_profile_idc[j−2]" in SPS (VPS). Here, "Tlprofile" is assumed at "2".

The encoded image data (access units) of the image data in the first extension format for a predetermined number of pictures such as 1GOP is arranged in the box "mdat" in each movie fragment in the MP4 stream "video-e1subbitstream" corresponding to the Track E1. Here, each access unit is configured of NAL units such as "PPS", "PSEI", "SLICE", and "SSEI".

The box "traf" is present in the box "moof" and the box "tfdt" is present in the box "traf" in each movie fragment in the MP4 stream "video-base sub bit stream" corresponding to the Track E1. The decode time "baseMediaDecodeTime" of the first access unit after the box "moof" is described in the box "tfdt".

Further, the box "tfdt" is present in the box "moof", the box "sgpd" is present in the box "tfdt", and the box "tscl" is present in the box "sgpd". Four parameters "temporalLayerId", "tllevel_idc", "Tlprofile", and "tlConstantFrameRate" are described in the box "tscl". "temporalLayerId" indicates a temporal ID (temporal_id). "tlConstantFrameRate" is assumed at "1", which indicates that the frame rate is constant.

"tllevel_idc" indicates an entire stream level of the extended video stream STe1 and the base video stream STb, and is matched with the element "sublayer_level_idc[j−1]" in SPS (VPS). Here, "tllevel_idc" is assumed at "153". "Tlprofile" indicates an entire stream profile of the extended video stream STe1 and the base video stream STb, and is matched with the element "sublayer_profile_idc[j−1]" in SPS (VPS). Here, "Tlprofile" is assumed at "7".

The encoded image data (access units) of the image data in the second extension format for a predetermined number of pictures such as 1GOP is arranged in the box "mdat" in each movie fragment in the MP4 stream "video-e1subbitstream" corresponding to the Track E2. Here, each access unit is configured of NAL units such as "PPS", "PSEI", "SLICE", and "SSEI".

The box "traf" is present in the box "moof" and the box "tfdt" is present in the box "traf" in each movie fragment in the MP4 stream "video-base sub bit stream" corresponding to the Track E2. The decode time "baseMediaDecodeTime" of the first access unit after the box "moof" is described in the box "tfdt".

Further, the box "tfdt" is present in the box "moof", the box "sgpd" is present in the box "tfdt", and the box "tscl" is present in the box "sgpd". Four parameters "temporalLayerId", "tllevel_idc", "Tlprofile", and "tlConstantFrameRate" are described in the box "tscl". "temporalLayerId" indicates a temporal ID (temporal_id). "tlConstantFrameRate" is assumed at "1", which indicates that the frame rate is constant.

"tllevel_idc" indicates an entire stream level of the extended video stream STe2, the extended video stream STe1, and the base video stream Stb, and is matched with the element "general_level_idc" in SPS (VPS). Here, "tllevel_idc" is assumed at "156". "Tlprofile" indicates an entire stream profile of the extended video stream STe2, the extended video stream STe1, and the base video stream STb, and is matched with the element "general_profile_idc" in SPS (VPS). Here, "Tlprofile" is assumed at "7".

The access units of the image data in the first extension format for a predetermined number of pictures are arranged in the box "mdat" in each movie fragment in the MP4 stream "video-e1subbitstream" corresponding to the Track E1 as described above. A SEI NAL unit having identification information indicating being spatially scalable and information indicating a spatially-scalable ratio is inserted into each access unit. According to the embodiment, newly-defined video scalability SEI (video scalability SEI) is inserted into the part "SEIs" in the access units (AU).

Further, the access units of the image data in the second extension format for a predetermined number of pictures are arranged in the box "mdat" in each movie fragment in the MP4 stream "video-e1subbitstream" corresponding to the Track E2 as described above. A SEI NAL unit having identification information indicating being temporally scalable, identification information indicating that the image data in the base format is obtained by performing the mixing processing, and information indicating a mix ratio (the first and second ratios) is inserted into each access unit. According to the embodiment, newly-defined video scalability SEI (video_scalability_SEI) is inserted into the part "SEIs" in the access units (AU).

FIG. 10 illustrates an exemplary structure (syntax) of video_scalability_SEI, and FIG. 11 illustrates contents (semantics) of main information in the exemplary structure. A 1-bit field in "temporal_scalable_flag" indicates whether a stream is temporally scalable. For example, "1" indicates being temporally scalable, and "0" indicates not being temporally scalable.

"temporal_scalable_flag" is set at "0" in the video scalability SEI inserted into the access units of the image data in the first extension format, and indicates that the stream is not temporally scalable. On the other hand, "temporal_scalable_flag" is set at "1" in the video scalability SEI inserted into the access units of the image data in the second extension format, and indicates that the stream is temporally scalable.

A 1-bit field in "spatial_scalable_flag" indicates whether a stream is spatially scalable. For example, "1" indicates being spatially scalable, and "0" indicates not being spatially scalable. "spatial_scalable_flag" is set at "1" in the video scalability SEI inserted into the access units of the image data in the first extension format, and indicates that the stream is spatially scalable. On the other hand, "spatial_scalable_flag" is set at "0" in the video scalability SEI inserted into the access units of the image data in the second extension format, and indicates that the stream is not spatially scalable.

When "spatial_scalable_flag" is "1", a 3-bit field of "scaling_ratio" is present. The field indicates a spatially-scalable ratio, or an enlargement ratio in a 1D direction of base and extension. For example, "001" indicates twice, "010" indicates triple, and "011" indicates fourfold. For example, when ultra-high-definition (UHD) is 4K definition, "scaling_ratio" is set at "001", and when ultra-high-definition (UHD) is 8K definition, "scaling_ratio" is set at "011".

When "temporal_scalable_flag" is "1", a 1-bit field of "picture_blending_flag" is present. The field indicates whether the picture mixing processing is performed on the base stream (image data in the base format). For example, "1" indicates that the mixing processing is performed, and "0" indicates that the mixing processing is not performed.

When "picture_blending_flag" is "1", a field indicating a mix ratio (the first and second ratios), or 3-bit fields of "blend_coef_alpha_alternatte_picture", "blend_coef_beta_alternate_picture", "blend_coef_alpha_current_picture", and "blend_coef_beta_current_picture" are present. The field of "blend_coef_alpha_alternatte_picture" is a coefficient (corresponding to a coefficient p described later) to be multiplied by a picture in the base layer. The field of "blend_coef_beta_alternate_picture" is a coefficient (corresponding to a coefficient r described later) to be multiplied by a current picture (in the extended stream). The field of "blend_coef_alpha_current_picture" is a coefficient (corresponding to a coefficient q described later) to be multiplied by a picture in the extended layer. The field of "blend_coef_beta_current_picture" is a coefficient (corresponding to a coefficient s described later) to be multiplied by a current picture (in the extended stream).

Returning to FIG. 8, identification information indicating being spatially scalable and information indicating a spatially-scalable ratio are inserted into the box "moof" in each movie fragment in the MP4 stream "video-e1subbitstream" corresponding to the Track E1. According to the embodiment, a box "udta" or "lays" is provided under the box "moof", and a newly-defined syntax of video scalability information descriptor (video_scalability_information_descriptor) is transmitted.

Further, identification information indicating being temporally scalable, identification information indicating that the image data in the base format is obtained by performing the mixing processing, and information indicating a mix ratio (the first and second ratios) are inserted into the box "moof" in each movie fragment in the MP4 stream "video-e1subbitstream" corresponding to the Track E2. According to the embodiment, the box "udta" or "lays" is provided under the box "moof", and a newly-defined syntax of video scalability information descriptor (video_scalability_information_descriptor) is transmitted.

FIG. 12 illustrates an exemplary structure (syntax) of video scalability information descriptor. Additionally, contents (semantics) of main information in the exemplary structure are similar to those of video scalability SEI described above, and the description thereof will be omitted.

FIG. 13 illustrates an exemplary description of a MPD file in transmitting three stream configurations (see FIG. 6). Representations corresponding to the base video stream STb (HD Base stream), the extended video stream STe1 (UHD E1 stream), and the extended video stream STe2 (UHD E2 stream) are present in the MPD file.

The descriptions "frame rate="60"", "codecs="hev1.A.L123,xx"", and "id="tag0" are present in the representation associated with the base video stream STb (HD Base stream). "frame rate="60" & L123 with no dependency id" indicates a 2K 60P base stream, and ""A"" indicates a value of 2 meaning "Main 10 Profile". Information indicating level and profile matches with the elements "sublayer_level_idc[j−2]" and "sublayer_profile_idc[j−2]" in SPS (VPS). Additionally, "sublayer_profile_idc[j−2]"="Main 10 Profile" is assumed, and "sublayer_level_idc[j−2]"="level 4.1"="123" is assumed. Further, a location destination of the base video stream STb (HD Base stream) is indicated as "video-basesubbitstream.mp4" by the description "<BaseURL>video-basesubbitstream.mp4</BaseURL>".

The descriptions "frame rate="60"", "codecs="hev1. B.L153,xx"" "id="tag1", and "dependency id="tag0"" are present in the representation associated with the extended video stream STe1 (UHD E1 stream). "Framerate="60" & L153 with dependency id tagged tag0" indicates that the 4K 60P stream is realized by extension onto the base stream, and ""B"" indicates a value of 7 meaning "Scalable Main 10 Profile". Information indicating level and profile matches with the elements "sublayer_level_idc[j−1]" and "sublayer_profile_idc[j−1]" in SPS (VPS). Additionally, "sublayer_profile_idc[j−1]"="Scalable Main 10 Profile" is assumed, and "sublayer_level_idc[j−1]"="level 5.1"="153" is assumed. Further, a location destination of the extended video stream STe1 (UHD E1 stream) is indicated as "video-e1subbitstream.mp4" by the description "<BaseURL>video-e1subbitstream.mp4</BaseURL>".

The descriptions "frame rate="120"", "codecs=" hev1.C.L156,xx"", "id="tag2", and "dependency id="tag0, tag1"" are present in the presentation associated with the extended video stream STe2 (UHD E2 stream). "frame rate="120" & L156 with dependency id tagged tag0, tag1" indicates that 4K 60P extension is performed onto the base stream and the extension component is further added thereto thereby to realize a 4K 120P stream, and ""C"" indicates a value of 7 meaning "Scalable Main 10 Profile". Information indicating level and profile matches with the elements "general_level_idc" and "general_profile_idc" in SPS (VPS) Additionally, "general_level_idc"="Scalable Main 10 Profile" is assumed and "general_level_idc"="level 5.2"="156" is assumed. Further, a location destination of the extended video stream STe2 (UHD E2 stream) is indicated as "video-e2subset.mp4" by the description "<BaseURL> video-e2subset.mp4</BaseURL>".

Information indicating a correspondence of scalability is inserted into the MPD file in this way, and indicates that spatial scalability and temporal scalability are realized at the same time.

Figure 14:
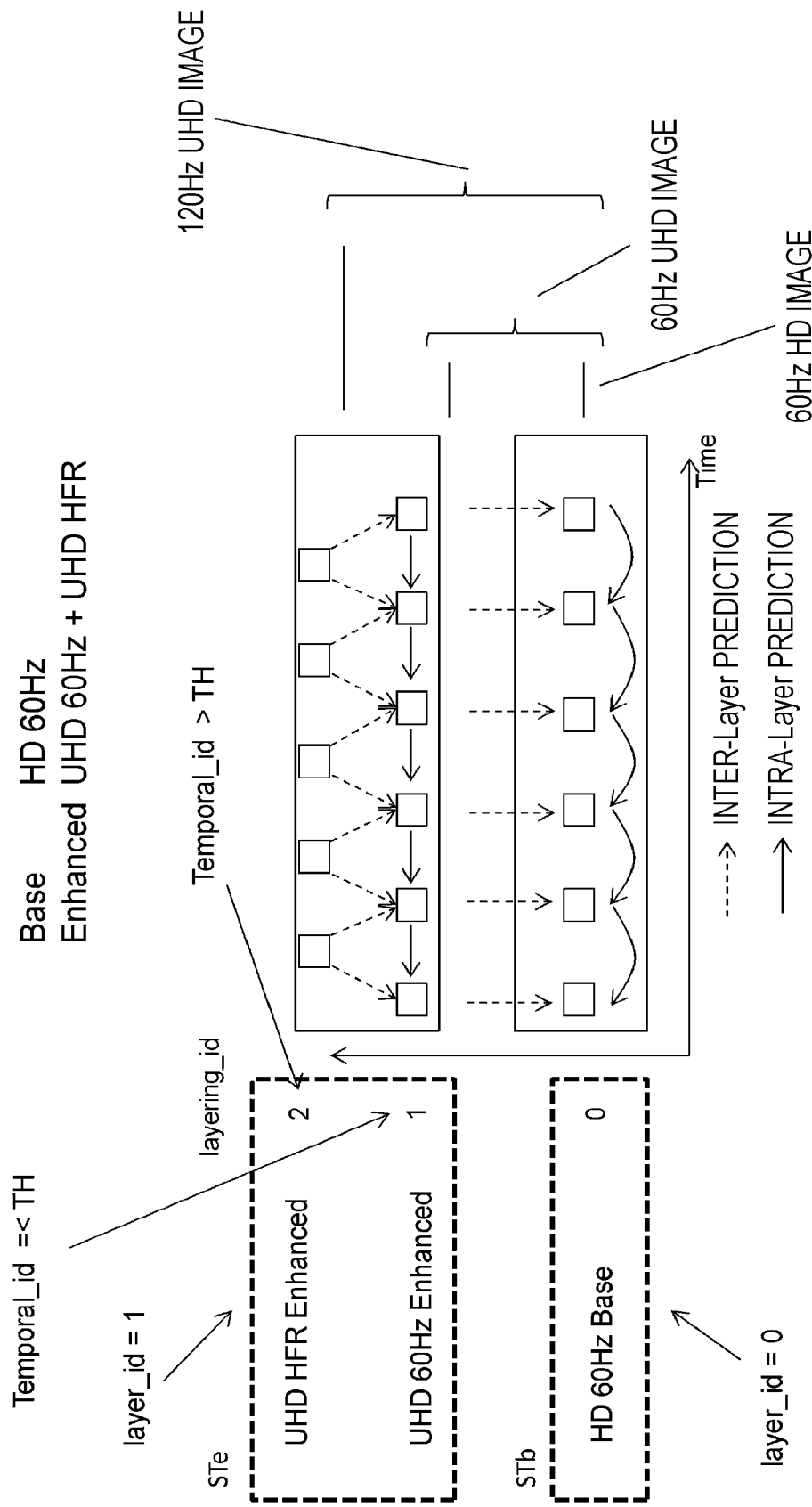
FIG. 14 is a diagram illustrating an exemplary stream configuration in transmitting two stream configurations including a base video stream STb and an extended stream STe.

FIG. 14 illustrates an exemplary stream configuration in transmitting two stream configurations including the base video stream STb and the extended stream STe. The illustrated example indicates a case with a high frame rate of 120 Hz. The horizontal axis indicates a picture order of composition (POC), where the left side indicates an earlier display time and the right side indicates a later display time. Each rectangular frame indicates a picture and an arrow indicates an exemplary picture reference relationship in the predictive encoding processing. For both inter-layer and intra-layer predictions, a current picture changes per block, and a direction of prediction and the number of references are not limited to the illustrated example.

A sequence of the image data "HD 60 Hz Base" in the base format included in the base video stream STb with a layering ID (layering_id) of "0" is present at the lowermost stage. The layer ID (Layer_id) of the image data "HD 60 Hz Base" is "0".

A sequence of the image data "UHD 60 Hz Enhanced" in the first extension format included in the extended video stream STe with a layering ID (layering_id) of "1" is present thereon. "UHD 60 Hz Enhanced" is scalability in the spatial direction relative to the image data "HD 60 Hz Base". The layer ID (Layer_id) of the image data "UHD 60 Hz Enhanced" is "1". Further, the temporal ID (Temporal_id) of the image data "UHD 60 Hz Enhanced" is assumed at a predetermined threshold TH or less.

A sequence of the image data "UHD HFR Enhanced" in the second extension format included in the extended video stream STe with a layering ID (layering_id) of "2" is present thereon. "UHD HFR Enhanced" is scalability in the temporal direction relative to the image data "UHD 60 Hz Enhanced". The layer ID (Layer_id) of the image data "UHD HFR Enhanced" is "1". Further, the temporal ID (Temporal_id) of the image data "UHD HFR Enhanced" is higher than the predetermined threshold TH.

As described above, the temporal ID of the image data "UHD 60 Hz Enhanced" is assumed at the threshold TH or less while the temporal ID of the image data "UHD HFR Enhanced" is higher than the threshold TH. Thereby, the image data "UHD 60 Hz Enhanced" and the image data "UHD HFR Enhanced" can be discriminated depending on whether the temporal ID is the threshold TH or less.

A high-definition (HD) image (60 Hz HD image) with base frame rate can be reproduced on the basis of the image data "HD 60 Hz Base" in the base format. Further, an ultra-high-definition (UHD) image (60 Hz UHD image) with base frame rate can be reproduced on the basis of the image data "HD 60 Hz Base" in the base format and the image data "UHD 60 Hz Enhanced" in the first extension format. Further, an ultra-high-definition (UHD) image (120 Hz UHD image) with high frame rate can be reproduced on the basis of the image data "HD 60 Hz Base" in the base format, the image data "UHD 60 Hz Enhanced" in the first extension format, and the image data "UHD HFR Enhanced" in the second extension format.

Figure 15:
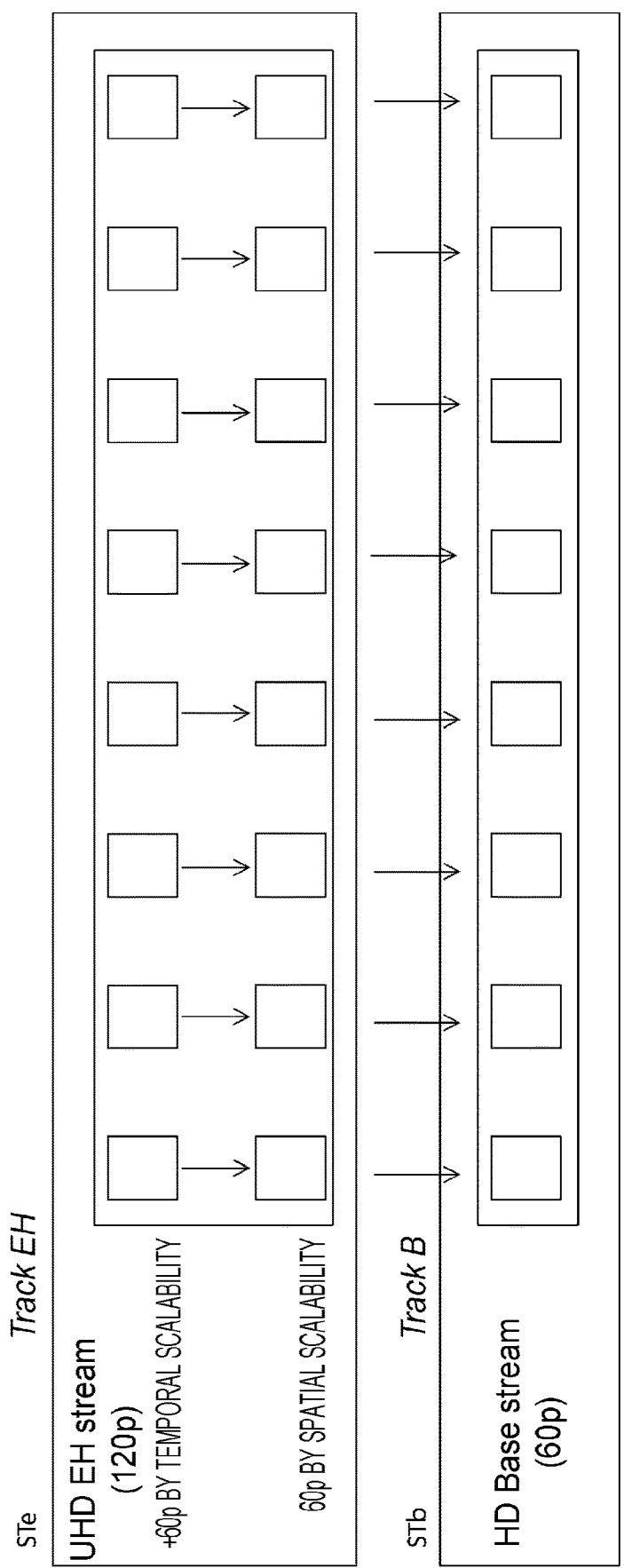
FIG. 15 is a diagram illustrating a DASH/MP4 Track configuration in transmitting two stream configurations.

FIG. 15 illustrates a DASH/MP4 Track configuration in transmitting two stream configurations. In this case, the Track B corresponding to the base video stream STb (HD Base stream) and a Track EH corresponding to the extended video stream (UHD EH stream) are present.

Each rectangular frame indicates a picture and an arrow indicates a correspondence of scalability. That is, image data of an ultra-high-definition (UHD) image with base frame rate or a 60 Hz UHD image is obtained by spatially-scalable extension using the image data in the first extension format included in the Track EH onto the image data in the base format included in the Track B. Further, image data of an ultra-high-definition (UHD) image with high frame rate or a 120 Hz UHD image is obtained by spatially scalable and temporally-scalable extensions using the image data in the first and second extension formats included in the Track EH onto the image data in the base format included in the Track B.

Figure 16:
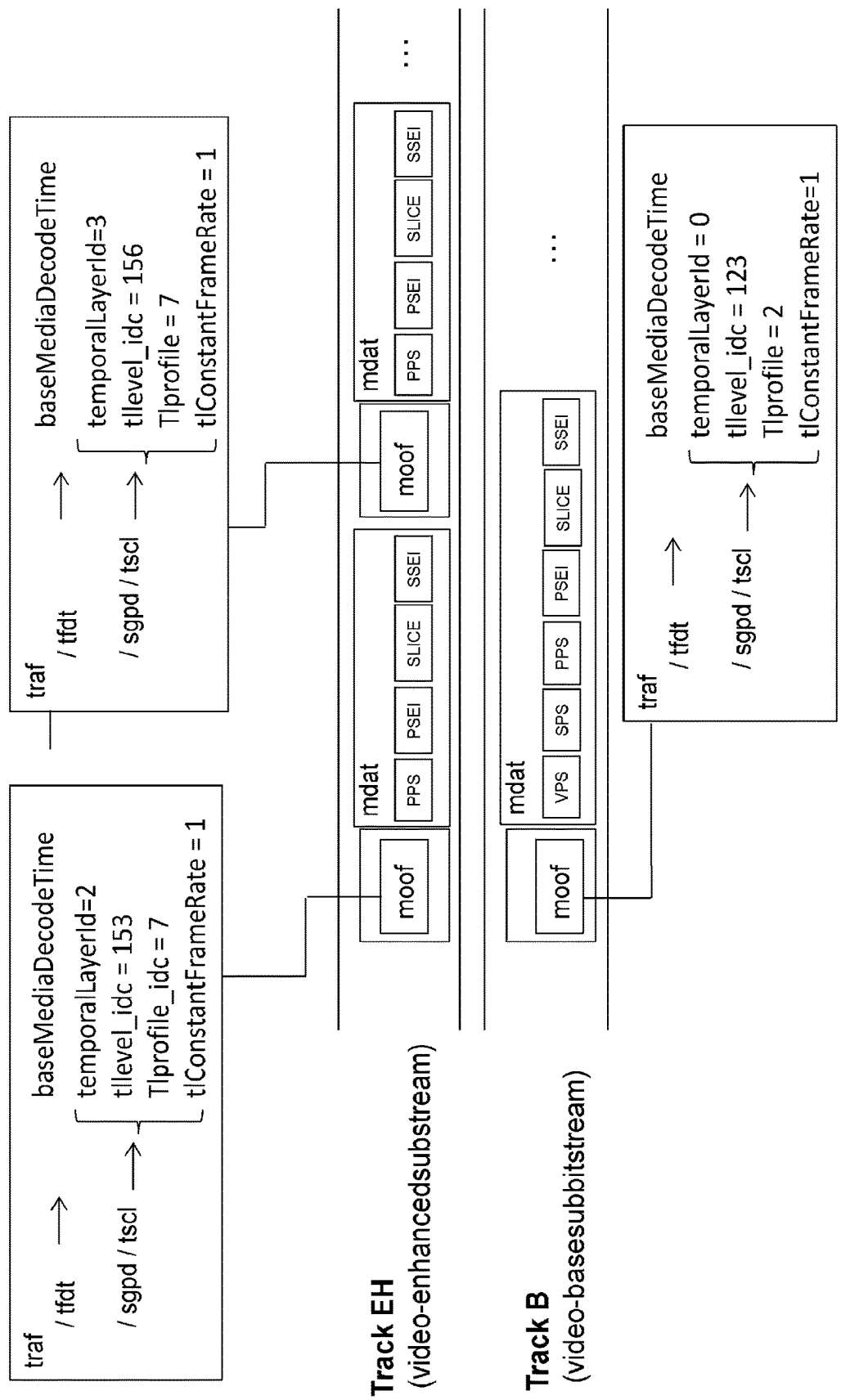
FIG. 16 is a diagram illustrating an exemplary configuration of a MP4 stream (file) including each Track data of Track B and Track EH.

FIG. 16 illustrates an exemplary configuration of a MP4 stream (file) including each Track data of the Track B and the Track EH. The illustrated example is a case of fragmented MP4. A predetermined number of movie fragments each configured of the box "moof" including control information and the box "mdat" including media data are arranged in the MP4 stream. Fragmented pieces of Track data are in the box "mdat", and thus the control information included in the box "moof" is control information regarding the pieces. Additionally, an inter-track predictive reference relationship, which will not be described in detail, is defined by arranging packets of NAL type called extractor per access unit in a Track.

The encoded image data (access units) of the image data in the base format for a predetermined number of pictures such as 1GOP is arranged in the box "mdat" in each movie fragment in the MP4 stream "video-base sub bit stream" corresponding to the Track B. Here, each access unit is configured of NAL units such as "VPS", "SPS", "PPS", "PSEI", "SLICE", and "SSEI". Additionally, "VPS" and "SPS" are inserted into the head picture of GOP, for example.

The box "traf" is present in the box "moof" and the box "tfdt" is present in the box "traf" in each movie fragment in the MP4 stream "video-base sub bit stream" corresponding to the Track B. The decode time "baseMediaDecodeTime" of the first access unit after the box "moof" is described in the box "tfdt".

Further, the box "tfdt" is present in the box "moof", the box "sgpd" is present in the box "tfdt", and the box "tscl" is present in the box "sgpd". Four parameters "temporalLayerId", "tllevel_idc", "Tlprofile", and "tlConstantFrameRate" are described in the box "tscl". "temporalLayerId" indicates a temporal ID (temporal_id). "tlConstantFrameRate" is assumed at "1", which indicates that the frame rate is constant.

"tllevel_idc" indicates a level of the base video stream STb, and is matched with the element "sublayer_level_idc [j−2]" in SPS (VPS). Here, "tllevel_idc" is assumed at "123". "TLprofile" indicates a profile of the base video stream STb, and is matched with the element "sublayer_profile_idc[j−2]" in SPS (VPS). Here, "Tlprofile" is assumed at "2".

The encoded image data (access units) of the image data in the first extension format or the encoded image data (access units) of the image data in the second extension format for a predetermined number of pictures such as 1GOP is arranged in the box "mdat" in each movie fragment in the MP4 stream "video-e1subbitstream" corresponding to the Track EH. Here, each access unit is configured of NAL units such as "PPS", "PSEI", "SLICE", and "SSEI".

The box "traf" is present in the box "moof" and the box "tfdt" is present in the box "traf" in each movie fragment in the MP4 stream "video-base sub bit stream" corresponding to the Track EH. The decode time "baseMediaDecodeTime" of the first access unit after the box "moof" is described in the box "tfdt".

Further, the box "tfdt" is present in the box "moof", the box "sgpd" is present in the box "tfdt", and the box "tscl" is present in the box "sgpd". Four parameters "temporalLayerID", "tllevel_idc", "Tlprofile", and "tlConstantFrameRate" are described in the box "tscl". "temporalLayerId" indicates a temporal ID (temporal_id). "tlConstantFrameRate" is assumed at "1", which indicates that the frame rate is constant.

"tllevel_idc" indicates an entire stream level of the first extended video stream (configured of the access units of the image data in the first extension format) and the base video stream STb in the box "moof" in each movie fragment corresponding to the image data in the first extension format, and is matched with the element "sublayer_level_idc[j−1]" in SPS (VPS). Here, "tllevel_idc" is assumed at "153". "Tlprofile" indicates an entire stream profile of the first extended video stream and the base video stream STb, and is matched with the element "sublayer_profile_idc[j−1]" in SPS (VPS). Here, "Tlprofile" is assumed at "7".

Further, "tllevel_idc" indicates an entire stream level of the extended video stream STe and the base video stream STb in the box "moof" in each movie fragment corresponding to the image data in the second extension format, and is matched with the element "general_level_idc" in SPS (VPS). Here, "tllevel_idc" is assumed at "156". "Tlprofile" indicates an entire stream profile of the extended video stream STe and the base video stream STb, and is matched with the element "general_profile_idc" in SPS (VPS). Here, "Tlprofile" is assumed at "7".

The access units of the image data in the first extension format or the access units of the image data in the first extension format for a predetermined number of pictures are arranged in the box "mdat" in each movie fragment in the MP4 stream (video-e1subbitstream" corresponding to the Track EH as described above.

A SEI NAL unit having identification information indicating being spatially scalable and information indicating a spatially-scalable ratio is inserted into each access unit of the image data in the first extension format. Further, a SEI NAL unit having identification information indicating being temporally scalable, identification information indicating that the image data in the base format is obtained by performing the mixing processing, and information indicating a mix ratio (the first and second ratios) is inserted into each access unit of the image data in the second extension format. According to the embodiment, newly-defined video scalability SEI (see FIG. 10) is inserted into the part "SEIs" in the access units (AU).

Further, identification information indicating being spatially scalable and information indicating a spatially-scalable ratio are inserted into the box "moof" corresponding to "mdat" having the access units of the image data in the first extension format in the MP4 stream "video-e1subbitstream" corresponding to the Track EH.

Further, identification information indicating being temporally scalable, identification information indicating that the image data in the base format is obtained by performing the mixing processing, and information indicating a mix ratio (the first and second ratios) are inserted into the box "moof" corresponding to "mdat" having the access units of the image data in the second extension format in the MP4 stream (video-e1subbitstream" corresponding to the Track EH.

According to the embodiment, the box "udta" or "lays" is provided under the box "moof", and a newly-defined syntax of video scalability information descriptor (see FIG. 12) is transmitted.

FIG. 17 illustrates an exemplary description of the MPD file in transmitting two stream configurations (see FIG. 14). The representations corresponding to the base video stream STb (HD Base stream) and the extended video stream STe (UHD EH stream) are present in the MPD file. Further, subrepresentation corresponding to the first extended video stream (configured of the access units of the image data in the first extension format) and subrepresentation corresponding to the second extended video stream (configured of the access units of the image data in the second extension format) are present in the representation of the extended video stream STe.

The descriptions "frame rate="60"", "codecs="hev1.A.L123,xx"", and "id="tag0"" are present in the representation associated with the base video stream STb (HD Base stream). "frame rate="60" & L123 with no dependency id" indicates a 2K 60P base stream, and ""A"" indicates a value of 2 meaning "Main 10 Profile". Information indicating level and profile matches with the elements "sublayer_level_idc[j−2]" and "sublayer_profile_idc[j−2]" in SPS (VPS). Additionally, "sublayer_profile_idc[j−2]"= "Main 10 Profile" is assumed, and "sublayer_level_idc[j−2]"="level 4.1"="123" is assumed. Further, a location destination of the base video stream STb (HD Base stream) is indicated as "video-basesubbitstream.mp4" by the description "<BaseURL>video-basesubbitstream.mp4</BaseURL>".

The descriptions "frame rate="60"", "codecs="hev1.B.L153,xx"", "id="tag1"", and "dependency id="tag0"" are present in the representation associated with the first extended video stream. "Framerate="60" & L153 with dependency id tagged tag0" indicates that a 4K 60P stream is realized by extension onto the base stream, and ""B"" indicates a value of 7 meaning "Scalable Main 10 Profile". Information indicating level and profile matches with the elements "sublayer_level_idc[j−1]" and "sublayer_profile_idc[j−1]" in SPS (VPS). Additionally, "sublayer_profile_idc[j−1]"="Scalable Main 10 Profile" is assumed and "sublayer_level_idc[j−1]"="level 5.1"="153" is assumed.

The descriptions "frame rate="120"", "codecs="hev1.C.L156,xx"", "id="tag2", and "dependency id="tag0, tag1"" are preset in the representation associated with the second extended video stream. "frame rate="120" & L156 with dependency id tagged tag0, tag1" indicates that 4K 60P extension is performed onto the base stream and the extension component is further added thereto thereby to realize a 4K 120P stream, and ""C"" indicates a value of 7 meaning "Scalable Main 10 Profile". Information indicating level and profile matches with the elements "general_level_idc" and "general_profile_idc" in SPS (VPS). Additionally, "general_level_idc"="Scalable Main 10 Profile" is assumed and "general_level_idc"="level 5.2"="156" is assumed.

Further, a location destination of the extended video stream STe (UHD EH stream) is indicated as "video-enhancedsubstream.mp4" by the description "<BaseURL>video-enhancedsubstream.mp4</BaseURL>" in the representation associated with the extended video stream STe (UHD EH stream).

Information indicating a correspondence of scalability is inserted into the MPD file in this way, and indicates that spatial scalability and temporal scalability are realized at the same time.

[Exemplary Configuration of Service Transmission System]

Figure 18:
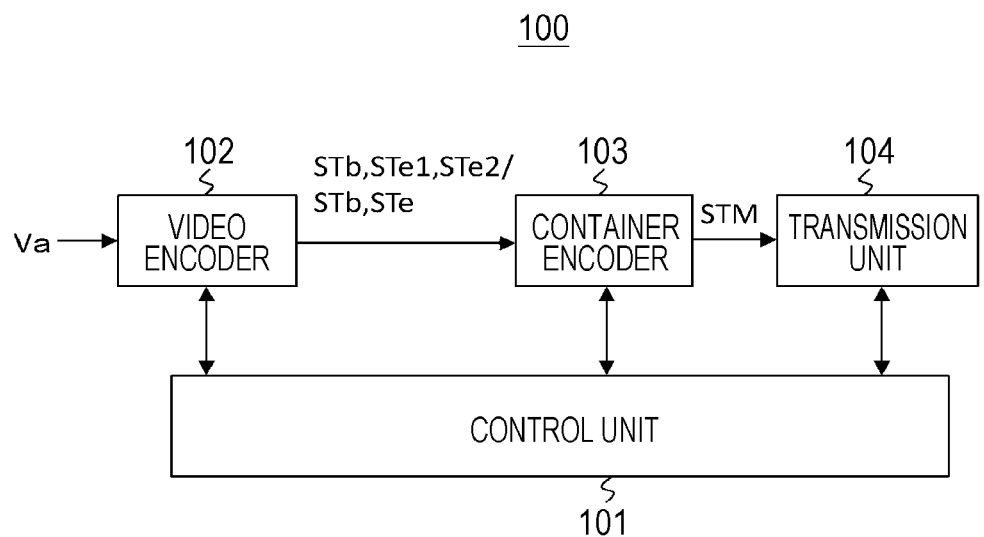
FIG. 18 is a block diagram illustrating an exemplary configuration of a service transmission system.

FIG. 18 illustrates an exemplary configuration of the service transmission system 100. The service transmission system 100 includes a control unit 101, a video encoder 102, a container encoder 103, and a transmission unit 104.

The control unit 101 includes a central processing unit (CPU) and controls the operations of each unit in the service transmission system 100 on the basis of a control program. The video encoder 102 inputs ultra-high-definition (UHD) image data Va with high frame rate (HFR) and outputs the base video stream STb and the extended video streams STe1 and STe2, or the base video stream STb and the extended video stream STe.

Figure 19:
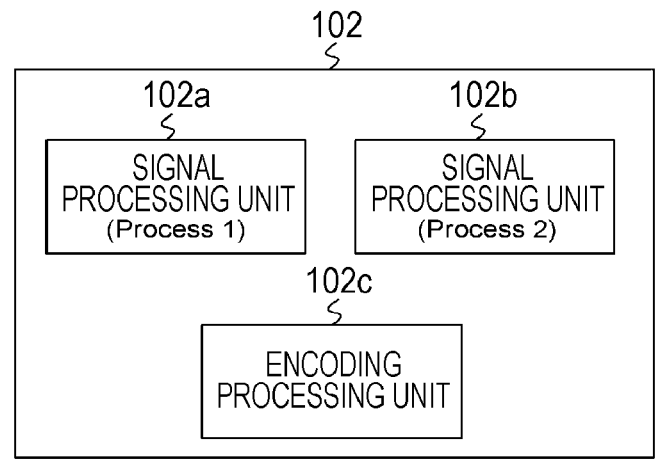
FIG. 19 is a diagram schematically illustrating a configuration of a video encoder.

FIG. 19 schematically illustrates a configuration of the video encoder 102. The video encoder 102 is configured of a signal processing unit 102a configured to perform process 1, a signal processing unit 102b configured to perform process 2, and an encoding processing unit 102c configured to perform a general encoding processing.

Figure 20:
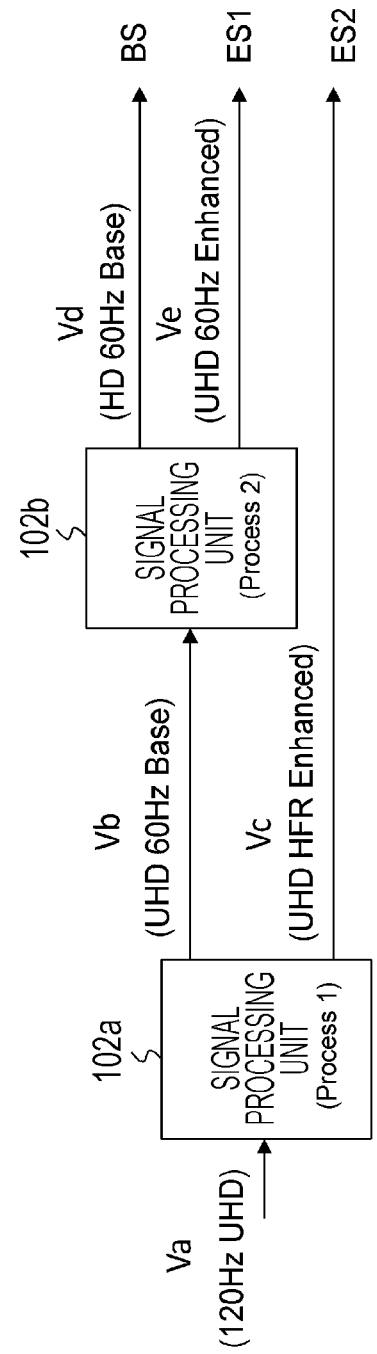
FIG. 20 is a diagram illustrating a signal processing unit configured to perform process 1 and a signal processing unit configured to perform process 2 in the video encoder.

FIG. 20 illustrates the signal processing unit 102a and the signal processing unit 102b in the video encoder 102. The illustrated example indicates a case with a high frame rate of 120 Hz. The signal processing unit 102a processes the ultra-high-definition image data Va (120 Hz UHD) with high frame rate thereby to obtain ultra-high-definition image data Vb (UHD 60 Hz Base) with base frame rate and image data Vc (UHD HFR Enhanced) to be image data ES2 in the second extension format for obtaining an ultra-high-definition image with high frame rate.

The signal processing unit 102b processes the image data Vb (UHD 60 Hz Base) thereby to obtain image data Vd (HD 60 Hz Base) to be image data BS in the base format for obtaining a high-definition image with base frame rate and to obtain image data Ve (UHD 60 Hz Enhanced) to be image data ES1 in the first extension format for obtaining an ultra-high-definition image with base frame rate.

FIG. 21(a) illustrates an exemplary configuration of the signal processing unit 102a. The signal processing unit 102a includes a delay circuit 111 configured to delay by one frame of 120 fps, a calculation circuit 112, and a latch circuit 113 configured to latch by a latch pulse of 60 Hz. Further, the calculation circuit 112 includes coefficient multiplication units 112a, 112b, 112c, and 112d and addition units 112e and 112f.

The coefficient multiplication units 112a and 112b and the addition unit 112e are used to perform the first-ratio mixing processing in units of two temporally-consecutive pictures. The coefficient p is multiplied in the coefficient multiplication unit 112a and the coefficient q is multiplied in the coefficient multiplication unit 112b. Additionally, p=0 to 1 and q=1−p are assumed. Further, the coefficient multiplication units 112c and 112d and the addition unit 112f are used to perform the second-ratio mixing processing in units of two temporally-consecutive pictures. The coefficient r is multiplied in the coefficient multiplication unit 112c and the coefficient s is multiplied in the coefficient multiplication unit 112d. Additionally r=0 to 1 and s=1−r are assumed.

The ultra-high-definition image data Va (120 Hz UHD) with high frame rate is delayed by one frame in the delay circuit 111 and then input into the coefficient multiplication units 112a and 112c configuring the calculation circuit 112. Further, the image data Va is input into the coefficient multiplication units 112b and 112d configuring the calculation circuit 112 as it is. The outputs of the coefficient multiplication units 112a and 112b are input into and added in the addition unit 112e. Further, the outputs of the coefficient multiplication units 112c and 112d are input into and added in the addition unit 112f.

Figure 21:
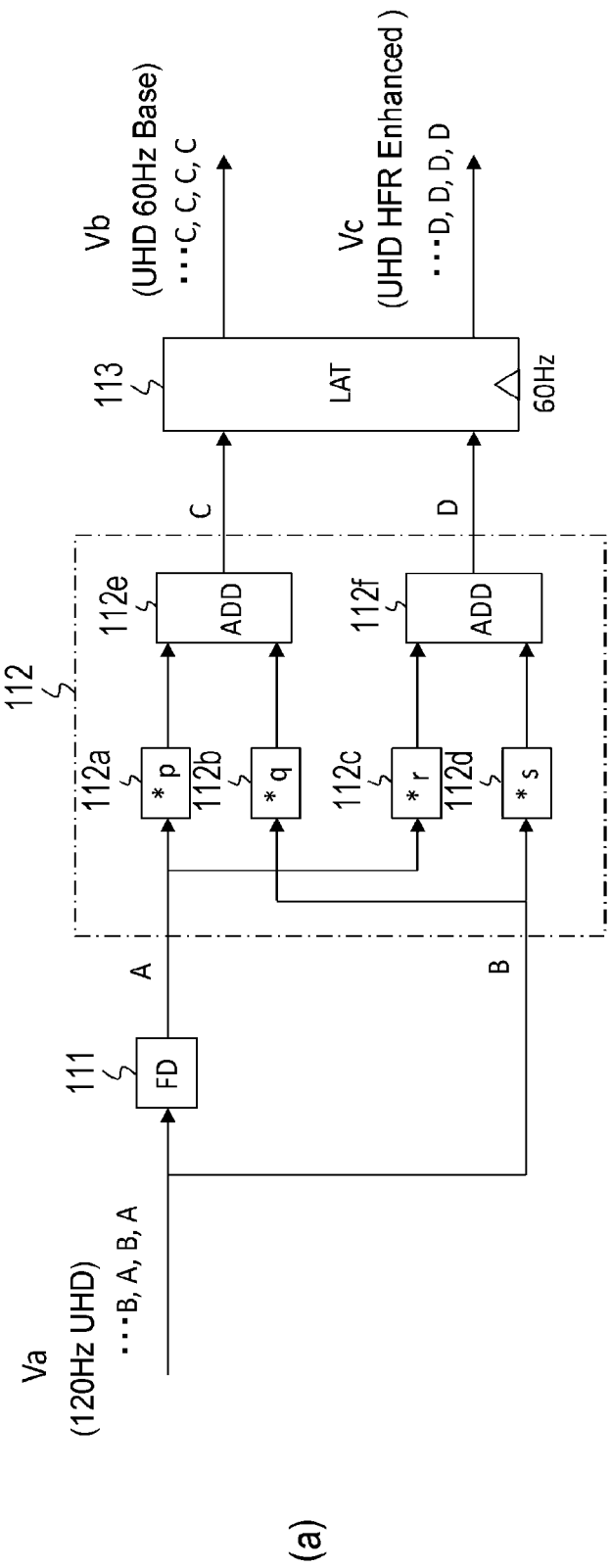
FIG. 21 is a block diagram illustrating an exemplary configuration of the signal processing unit configured to perform process 1.

Here, assuming image data A and B of two temporally-consecutive pictures of image data P, mix output of C(=p*A+q*B) is obtained as output of the addition unit 112e and mix output of D (=r*A+s*B) is obtained as output of the addition unit 112f when the output of the delay circuit 111 is A. FIG. 21 (b) indicates the calculation for the mixing processing in the calculation circuit 112 in a mathematical equation.

The outputs of the addition units 112e and 112f in the calculation circuit 112 are input into the latch circuit 113. The outputs of the addition units 112e and 112f in the calculation circuit 112 are latched by a latch pulse of 60 Hz in the latch circuit 113 thereby to obtain the ultra-high-definition image data Vb (UHD 60 Hz Base) with base frame rate and the image data Vc (UHD HFR Enhanced) to be the image data ES2 in the second extension format for obtaining an ultra-high-definition image with high frame rate.

Here, the image data Vb is obtained by performing the first-ratio mixing processing on the image data Va in units of two temporally-consecutive pictures. Further, the image data Vb is obtained by performing the second-ratio mixing processing on the image data Va in units of two temporally-consecutive pictures.

Figure 22:
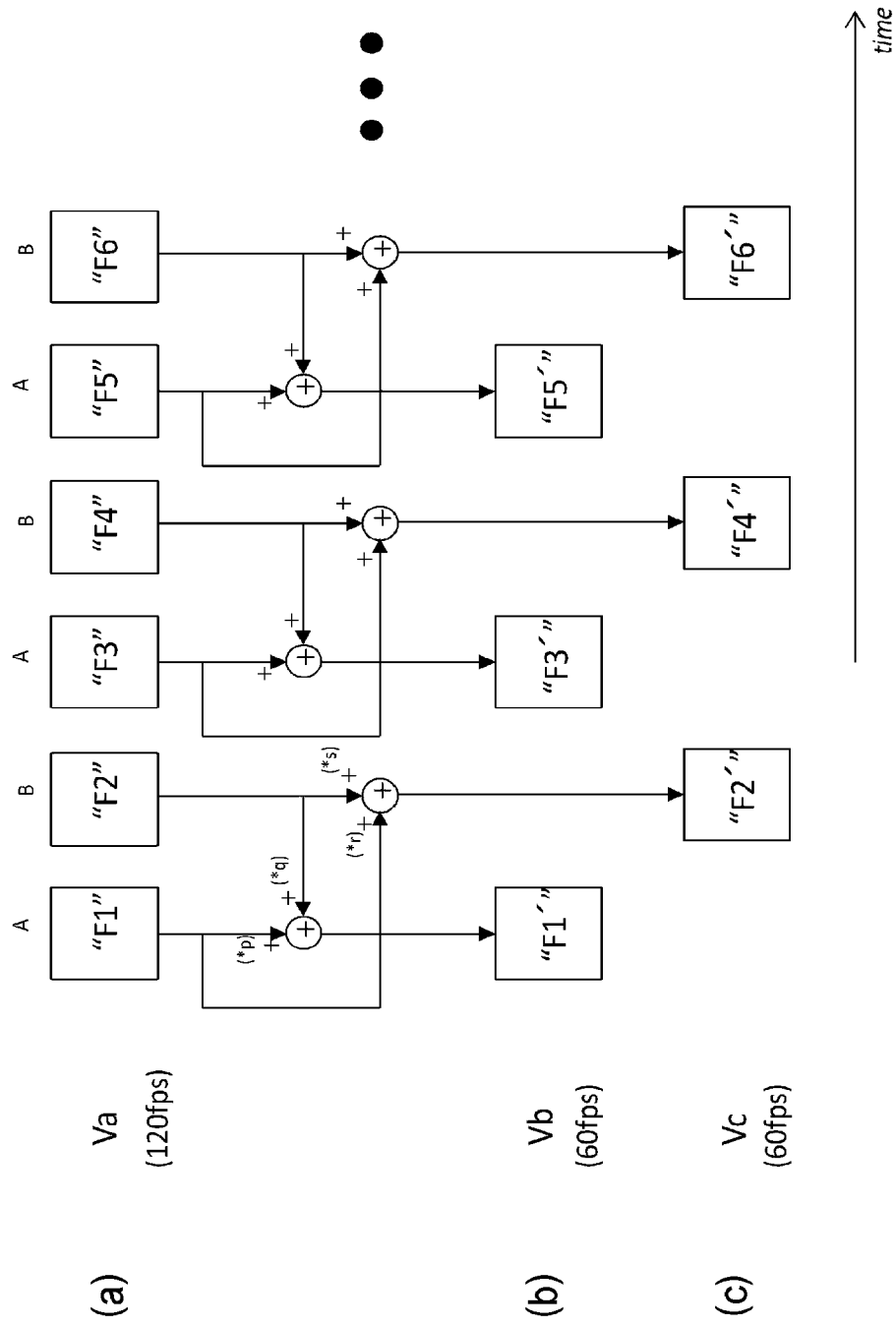
FIG. 22 is a diagram schematically illustrating exemplary relationships between input data (image data Va) and output data (image data Vb and Vc) in the signal processing unit configured to perform process 1.

FIG. 22 schematically illustrates exemplary relationships between input data (image data Va) in the signal processing unit 102a and output data (image data Vb and Vc) in the signal processing unit 102a. FIG. 22(a) illustrates the image data Va, FIG. 22 (b) illustrates the image data Vb, and FIG. 22(c) illustrates the image data Vc. Image data F1', F3', F5', . . . of respective pictures of the 60 fps image data Vb and image data F2', F4', F6', . . . of respective pictures of the 60 fps image data Vc are obtained corresponding to the image data F1, F2, F3, F4, F5, F6, F7, F8, ... of respective pictures of the 120 fps image data Va.

Figure 23:
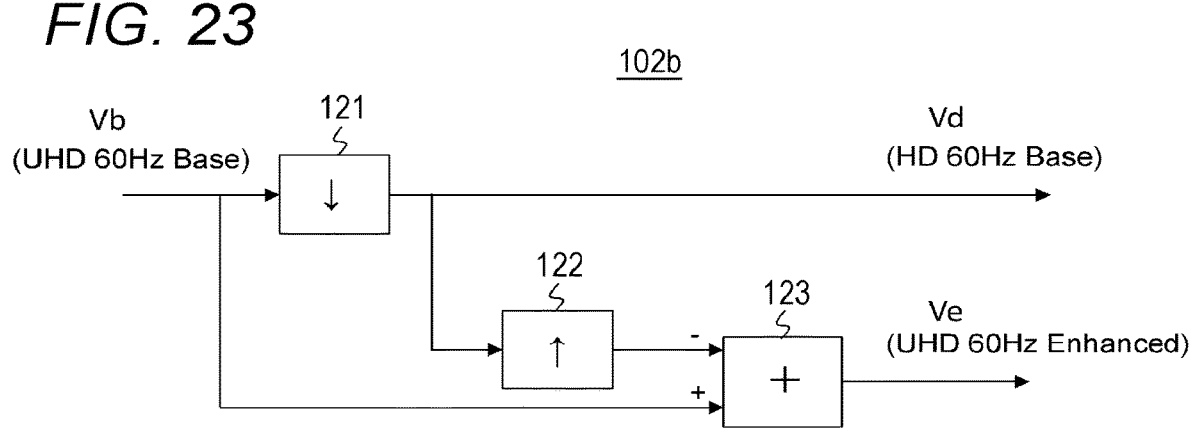
FIG. 23 is a block diagram illustrating an exemplary configuration of the signal processing unit configured to perform process 2.

FIG. 23 illustrates an exemplary configuration of the signal processing unit 102b. The signal processing unit 102b includes a downscale circuit 121, an upscale circuit 122, and a calculation circuit 123. The ultra-high-definition image data Vb (UHD 60 Hz Base) with base frame rate is input into the downscale circuit 121. The downscale circuit 121 performs a downscale processing on the image data Vb from ultra-high-definition to high-definition thereby to obtain the image data Vd (HD 60 Hz Base) to be the image data BS in the base format.

Further, the image data Vd obtained in the downscale circuit 121 is input into the upscale circuit 122. The upscale circuit 122 performs an upscale processing on the image data Vd from high-definition to ultra-high-definition thereby to obtain ultra-high-definition image data with base frame rate. The image data is assumed to have the same definition as the image data Vb, but is obtained by performing the downscale processing and then the upscale processing on the image data Vb, and does not reproduce the information lost in the downscale processing.

The image data Vb and the image data obtained in the upscale circuit 122 are input into the calculation circuit 123. The calculation circuit 123 takes a difference between two items of image data, and obtains the image data Ve (UHD 60 Hz Enhanced) to be the image data ES1 in the first extension format.

Returning to FIG. 18, the video encoder 102 inserts the newly-defined video scalability SEI (see FIG. 10) into the part "SEIs" in the access units (AU) of the image data ES1 and ES2 in the first and second extension formats.

Thereby, identification information indicating being spatially scalable and information indicating a spatially-scalable ratio are inserted into each access unit of the image data ES1 in the first extension format. Further, identification information indicating being temporally scalable, identification information indicating that the image data in the base format is obtained by performing the mixing processing, and information indicating a mix ratio (the first and second ratios) are inserted into each access unit of the image data ES2 in the second extension format.

The container encoder 103 generates a container including the base video stream STb and the extended video streams STe1 and STe2 or the base video stream STb and the extended video stream STe obtained in the video encoder 102, or MP4 (see FIG. 8 and FIG. 16) here as a distribution stream STM.

At this time, the container encoder 103 provides the box "udta" or "lays" under the box "moof" in the MP4 stream corresponding to the extended video streams STe1 and STe2 or the extended video stream STe, and inserts the video scalability information descriptor (see FIG. 12).

Thereby, identification information indicating being spatially scalable and information indicating a spatially-scalable ratio are inserted into the box "moof" corresponding to the box "mdat" having the access units of the image data ES1 in the first extension format. Further, identification information indicating being temporally scalable, identification information indicating that the image data in the base format is obtained by performing the mixing processing, and information indicating a mix ratio (the first and second ratios) are inserted into the box "moof" corresponding to the box "mdat" having the access units of the image data ES2 in the second extension format.

The transmission unit 104 transmits the distribution stream STM of MP4 obtained in the container encoder 103 to the service receiver 200 on a broadcast wave or an Internet packet.

The operations of the service transmission system 100 illustrated in FIG. 18 will be briefly described. The ultra-high-definition (UHD) image data Va with high frame rate (HFR) is input into the video encoder 102. The video encoder 102 processes the image data Va thereby to obtain the base video stream STb and the extended video streams STe1 and STe2 or the base video stream STb and the extended video stream STe.

Here, the base video stream STb includes the access units of the image data BS in the base format for obtaining a high-definition image with base frame rate. The extended video stream STe1 includes the access units of the image data ES1 in the first extension format for obtaining an ultra-high-definition image with base frame rate. The extended video stream STe2 includes the access units of the image data ES2 in the second extension format for obtaining an ultra-high-definition image with base frame rate. Further, the extended video stream STe includes the access units of the image data ES1 and ES2 in the first and second extension formats.

The video encoder 102 inserts the video scalability SEI (see FIG. 10) into the part "SEIs" in the access units (AU) of the image data ES1 and ES2 in the first and second extension formats. Thereby, identification information indicating being spatially scalable and information indicating a spatially-scalable ratio are inserted into each access unit of the image data ES1. Further, identification information indicating being temporally scalable, identification information indicating that the image data in the base format is obtained by performing the mixing processing, and information indicating a mix ratio (the first and second ratios) are inserted into each access unit of the image data ES2.

The base video stream STb and the extended video streams STe1 and STe2 or the base video stream STb and the extended video stream STe obtained in the video encoder 102 are supplied to the container encoder 103. The container encoder 103 generates MP4 (see FIG. 8 and FIG. 16) including the base video stream STb and the extended video streams STe1 and STe2 or the base video stream STb and the extended stream STe as a distribution stream STM.

At this time, the container encoder 103 provides the box "udta" or "lays" under the box "moof" in the MP4 stream corresponding to the extended video streams STe1 and STe2 or the extended video stream STe, and inserts the video scalability information descriptor (see FIG. 12).

Thereby, identification information indicating being spatially scalable and information indicating a spatially-scalable ratio are inserted into the box "moof" corresponding to the box "mdat" having the access units of the image data ES1. Further, identification information indicating being temporally scalable, identification information indicating that the image data in the base format is obtained by performing the mixing processing, and information indicating a mix ratio (the first and second ratios) are inserted into the box "moof" corresponding to the box "mdat" having the access units of the image data ES2.

The distribution stream STM generated in the container encoder 103 is supplied to the transmission unit 104. The transmission unit 104 transmits the distribution stream STM of MP4 to the service receiver 200 on a broadcast wave or an Internet packet.

[Exemplary Configuration of Service Receiver]

Figure 24:
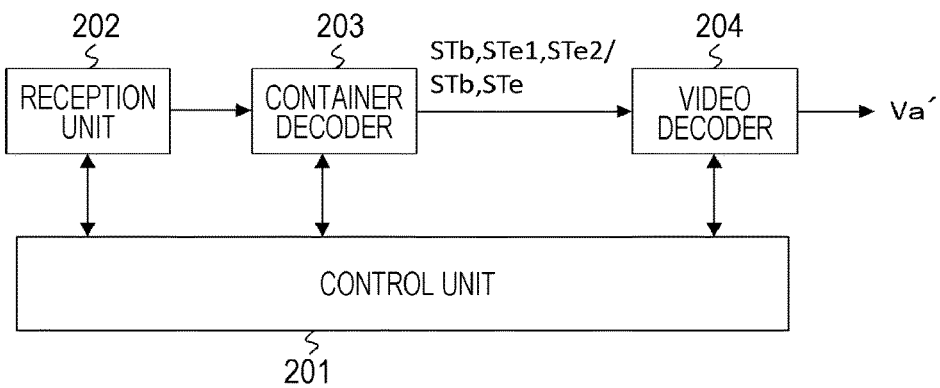
FIG. 24 is a block diagram illustrating an exemplary configuration of a service receiver capable of processing ultra-high-definition moving image data with high frame rate.

FIG. 24 illustrates an exemplary configuration of the service receiver 200A capable of processing ultra-high-definition moving image data with high frame rate. The service receiver 200A includes a control unit 201, a reception unit 202, a container decoder 203, and a video decoder 204.

The control unit 201 includes a central processing unit (CPU), and controls the operations of each unit in the service receiver 200A on the basis of a control program. The reception unit 202 receives the distribution stream STM of MP4 sent on a broadcast wave or an Internet packet from the service transmission system 100.

The container decoder 203 extracts the base video stream STb and the extended video streams STe1 and STe2 or the base video stream STb and the extended video stream STe from MP4. As described above, the base video stream STb includes the access units of the image data BS in the base format for obtaining a high-definition image with base frame rate.

Further, the extended video stream STe1 includes the access units of the image data ES1 in the first extension format for obtaining an ultra-high-definition image with base frame rate. The extended video stream STe2 includes the access units of the image data ES2 in the second extension formation for obtaining an ultra-high-definition image with high frame rate. Further, the extended video stream STe includes the access units of the image data ES1 and ES2 in the first and second extension formats.

Further, the container decoder 203 extracts meta-information from MP4 and sends it to the control unit 201. The meta-information includes the video scalability information descriptor (see FIG. 12) inserted into the box "udta" or "lays provided under the box "moof" in the MP4 stream corresponding to the extended video streams STe1 and STe2 or the extended video stream STe.

The control unit 201 recognizes that extension by the image data ES1 in the first extension format is spatially scalable, the spatially-scalable ratio, and the like from the video scalability information descriptor. Further, the control unit 201 recognizes that extension by the image data ES2 in the second extension format is temporally scalable, that the image data BS in the base format is obtained by performing the mixing processing, the mix ratio (the first and second ratios), and the like from the video scalability information descriptor.

The video decoder 204 processes the base video stream STb and the extended video streams STe1 and STe2 or the base video stream STb and the extended video stream STe extracted in the container decoder 203 thereby to obtain ultra-high-definition (UHD) image data Va' with high frame rate (HFR).

Here, the video decoder 204 extracts the parameter set or SEI inserted into the access units configuring each video stream, and sends it to the control unit 201. SEI includes the video scalability SEI (see FIG. 10) inserted into the access units (AU) of the image data ES1 and ES2 in the first and second extension formats.

The control unit 201 recognizes that extension by the image data ES1 in the first extension format is spatially scalable, the spatially-scalable ratio, and the like from the video scalability SEI. Further, the control unit 201 recognizes that extension by the image data ES2 in the second extension format is temporally scalable, that the image data BS in the base format is obtained by performing the mixing processing, the mix ratio (the first and second ratios), and the like from the video scalability SEI.

Figure 25:
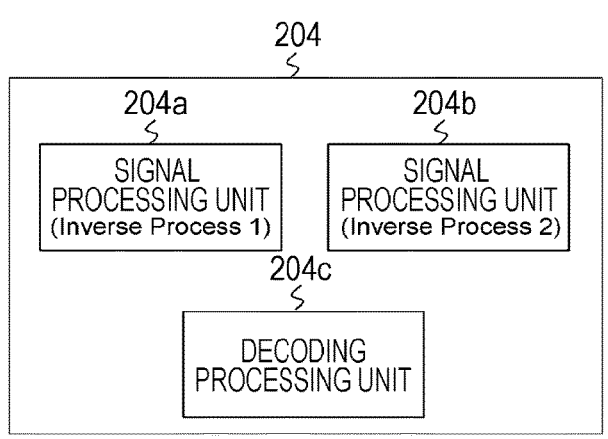
FIG. 25 is a diagram schematically illustrating a configuration of a video decoder.

FIG. 25 schematically illustrates a configuration of the video decoder 204. The video decoder 204 is configured of a signal processing unit 204a configured to perform inverse process 1, a signal processing unit 204b configured to perform inverse process 2, and a decoding processing unit 204c configured to perform a general decoding processing. Here, the processing of inverse process 1 is reverse to the processing of process 1 performed in the signal processing unit 102a in the video encoder 102. Similarly, the processing of inverse process 2 is reverse to the processing of process 2 performed in the signal processing unit 102b in the video encoder 102.

Figure 26:
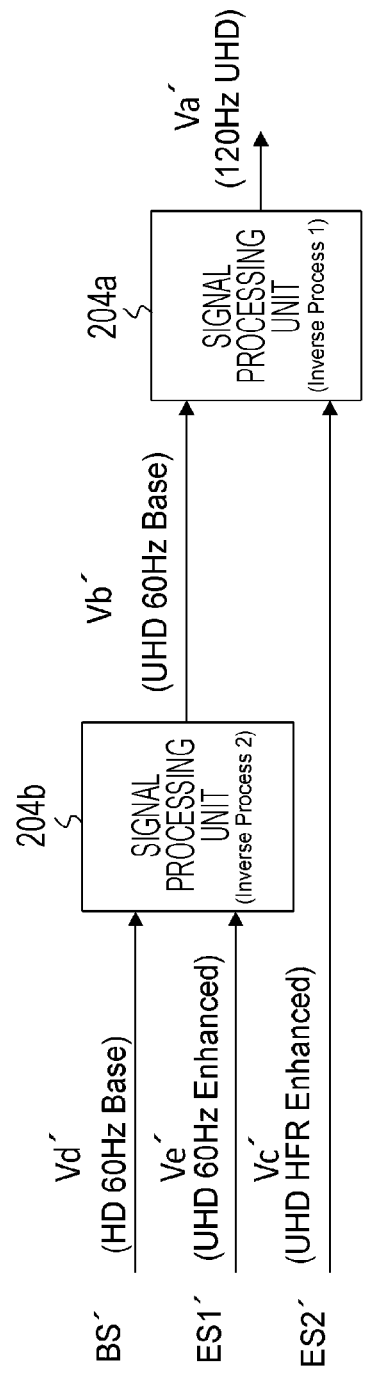
FIG. 26 is a diagram illustrating a signal processing unit configured to perform inverse process 1 and a signal processing unit configured to perform inverse process 2 in the video decoder.

FIG. 26 illustrates the signal processing unit 204a and the signal processing unit 204b in the video decoder 204. The illustrated example indicates a case with a high frame rate of 120 Hz. The signal processing unit 204b processes image data Vd' (HD 60 Hz Base) as image data BS' in the base format and image data Ve' (UHD 60 Hz Enhanced) as image data ES1' in the first extension format for obtaining an ultra-high-definition image with base frame rate thereby to obtain ultra-high-definition image data Vb' (UHD 60 Hz Base) with base frame rate.

The signal processing unit 204a processes the image data Vb' (UHD 60 Hz Base) and image data Vc' (UHD HFR Enhanced) as image data ES2' in the second extension format for obtaining an ultra-high-definition image with high frame rate thereby to obtain the ultra-high-definition image data Va' (120 Hz UHD) with high frame rate.

Figure 27:
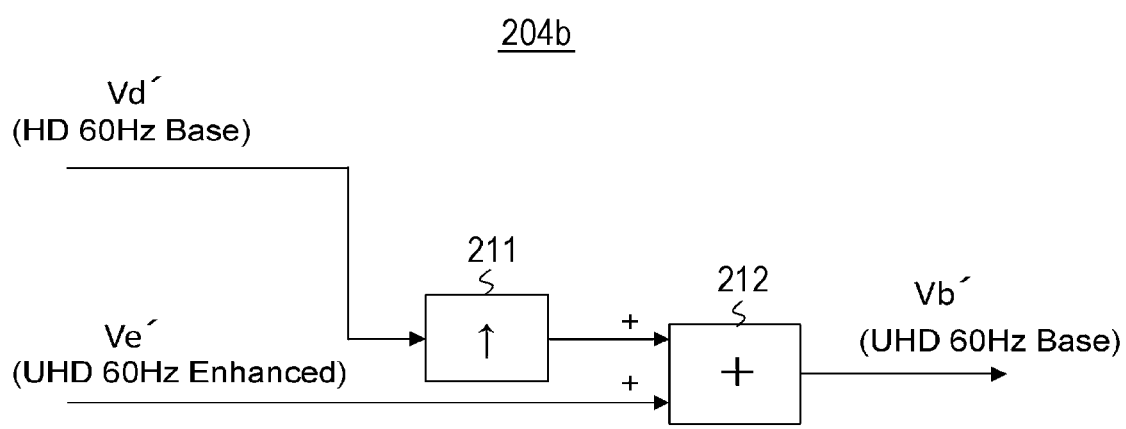
FIG. 27 is a block diagram illustrating an exemplary configuration of the signal processing unit configured to perform inverse process 2.

FIG. 27 illustrates an exemplary configuration of the signal processing unit 204b. The signal processing unit 204b includes an upscale circuit 211 and a calculation circuit 212. The image data Vd' (HD 60 Hz Base) as the image data BS' in the base format is input into the upscale circuit 211. The upscale circuit 211 performs an upscale processing on the image data Vd' from high-definition to ultra-high-definition thereby to obtain ultra-high-definition image data with base frame rate. Here, the upscale circuit 211 performs an appropriate upscale processing by use of the information indicating a spatially-scalable ratio inserted into the video scalability SEI (see FIG. 10) or the video scalability information descriptor (see FIG. 12) as described above.

The image data Ve' (UHD 60 Hz Enhanced) as the image data ES1' in the first extension format and the image data obtained in the upscale circuit 211 are input into the calculation circuit 212. The calculation circuit 212 adds the two items of image data thereby to obtain the ultra-high-definition image data Vb' (UHD 60 Hz Base) with base frame rate.

Figure 28:
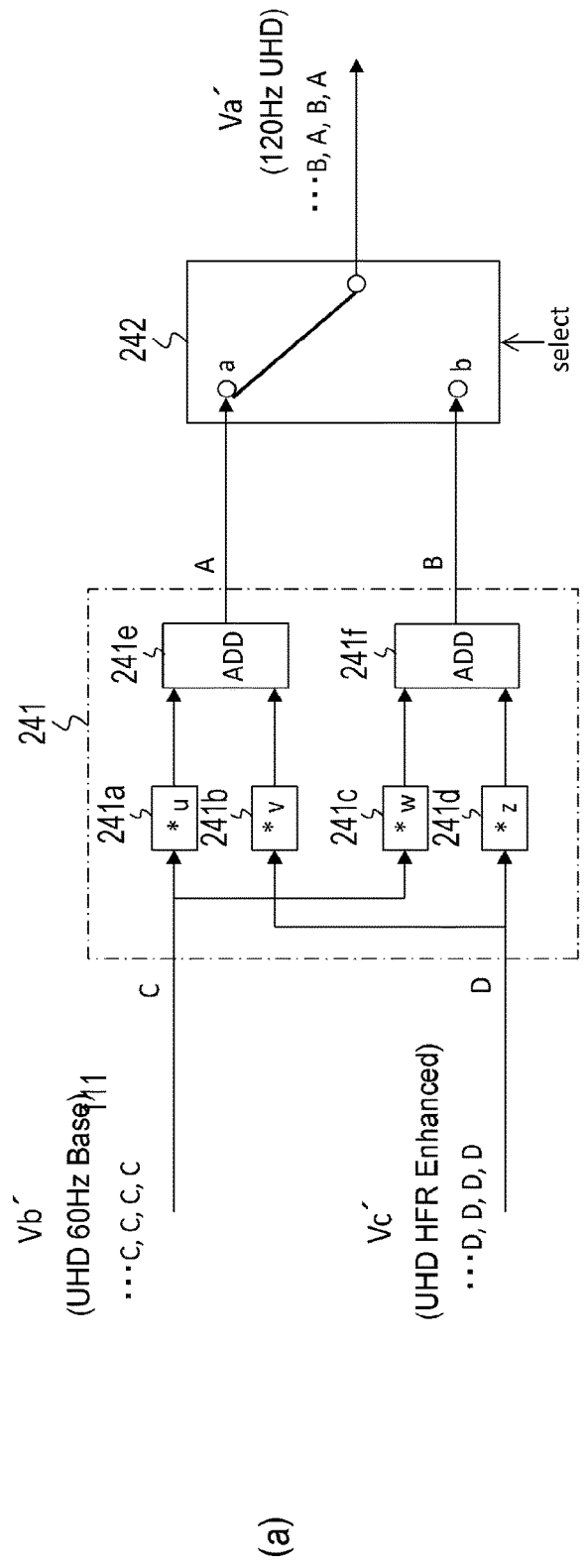
FIG. 28 is a block diagram illustrating an exemplary configuration of the signal processing unit configured to perform inverse process 1.

FIG. 28 illustrates an exemplary configuration of the signal processing unit 204a. The signal processing unit 204a includes a calculation circuit 241 and a switch circuit 242. Further, the calculation circuit 241 includes coefficient multiplication units 241a, 241b, 241c, and 241d and addition units 241e and 241f. The calculation circuit 241 performs a reverse processing to the mixing processing (reverse mixing processing) in the calculation circuit 112 in the signal processing unit 102a in FIG. 21(a).

The coefficient multiplication units 241a and 241b and the addition unit 241e are used for obtaining image data of the first picture in units of the two temporally-consecutive pictures from the image data Vb' and the image data Vc'. A coefficient u is multiplied in the coefficient multiplication unit 241a, and a coefficient v is multiplied in the coefficient multiplication unit 241b. Further, the coefficient multiplication units 241c and 241d and the addition unit 241f are used for obtaining image data of the second picture in units of the two temporally-consecutive pictures from the image data Vb' and the image data Vc'. A coefficient w is multiplied in the coefficient multiplication unit 241c, and a coefficient z is multiplied in the coefficient multiplication unit 241d.

The ultra-high-definition image data Vb' (UHD 60 Hz Base) with base frame rate is input into the coefficient multiplication units 241a and 241c configuring the calculation circuit 241. Further, the image data Vc' (UHD HFR Enhanced) as the image data ES2' in the second extension format is input into the coefficient multiplication units 241b and 241d configuring the calculation circuit 241. The outputs of the coefficient multiplication units 241a and 241b are input into and added in the addition unit 241e. Further, the outputs of the coefficient multiplication units 241c and 241d are input into and added in the addition unit 241f.

In this case, image data A of the first picture in units of the two temporally-consecutive pictures is obtained as output of the addition unit 241e, and image data B of the second picture in units of the two temporally-consecutive pictures is obtained as output of the addition unit 241f. FIG. 28 (b) indicates the calculation for the reverse mixing processing in the calculation circuit 241 in a mathematical equation. Further, FIG. 28 (c) illustrates a correspondence between the coefficients u, v, w, and z and the coefficients p, q, r, and s in a matrix.

The outputs of the addition units 241e and 241f in the calculation circuit 241 are input into the fixed terminals on the side a and the side b in the switch circuit 242, respectively. The switch circuit 242 is alternately switched between the side a and the side b at a cycle of 120 Hz. The ultra-high-definition image data Va' (120 Hz UHD) with high frame rate, in which the image data A and B are combined, is obtained in the switch circuit 242.

Here, the calculation circuit 241 performs an appropriate reverse mixing processing by use of the information indicating a mix ratio (the first and second ratios) or the information regarding p, q, r, and s inserted into the video scalability SEI (see FIG. 10) or the video scalability information descriptor (see FIG. 12) as described above.

The operations of the service receiver 200A illustrated in FIG. 24 will be briefly described. The reception unit 202 receives the distribution stream STM of MP4 sent on a broadcast wave or an Internet packet from the service transmission system 100. The distribution stream STM is supplied to the container decoder 203. The container decoder 203 extracts the base video stream STb and the extended video streams STe1 and STe2 or the base video stream STb and the extended video stream STe from MP4.

The base video stream STb includes the access units of the image data BS in the base format for obtaining a high-definition image with base frame rate. Further, the extended video stream STe1 includes the access units of the image data ES1 in the first extension format for obtaining an ultra-high-definition image with base frame rate. The extended video stream STe2 includes the access units of the image data ES2 in the second extension format for obtaining an ultra-high-definition image with base frame rate. Further, the extended video stream STe includes the access units of the image data ES1 and ES2 in the first and second extension formats.

Further, the container decoder 203 extracts meta-information from MP4 and sends it to the control unit 201. The meta-information includes the video scalability information descriptor (see FIG. 12) inserted into the box "udta" or "lays" provided under the box "moof" in the MP4 stream corresponding to the extended video streams STe1 and STe2 or the extended video stream STe.

The control unit 201 recognizes that extension by the image data ES1 in the first extension format is spatially scalable, the spatially-scalable ratio, and the like from the video scalability information descriptor. Further, the control unit 201 recognizes that extension by the image data ES1 in the second extension format is temporally scalable, that the image data BS in the base format is obtained by performing the mixing processing, the mix ratio (the first and second ratios), and the like from the video scalability information descriptor.

The base video stream STb and the extended video streams STe1 and STe2 or the base video stream STb and the extended video stream STe extracted in the container decoder 203 are supplied to the video decoder 204. The video decoder 204 processes the base video stream STb and the extended video streams STe1 and STe2 or the base video stream STb and the extended video stream STe thereby to obtain the ultra-high-definition (UHD) image data Va' with high frame rate (HFR).

Here, the video decoder 204 extracts the parameter set or SEI inserted into the access units configuring each video stream, and sends it to the control unit 201. SEI includes the video scalability SEI (see FIG. 10) inserted into the access units (AU) of the image data ES1 and ES2 in the first and second extension formats.

The control unit 201 recognizes that extension by the image data ES1 in the first extension format is spatially scalable, the spatially-scalable ratio, and the like from the video scalability SEI. Further, the control unit 201 recognizes that extension by the image data ES1 in the second extension format is temporally scalable, that the image data BS in the base format is obtained by performing the mixing processing, the mix ratio (the first and second ratios), and the like from the video scalability SEI.

Figure 29:
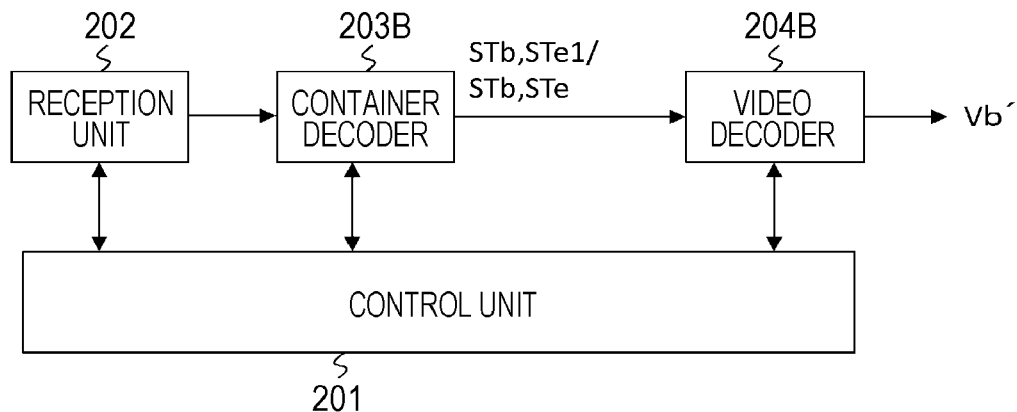
FIG. 29 is a block diagram illustrating an exemplary configuration of a service receiver capable of processing ultra-high-definition moving image data with base frame rate.

FIG. 29 illustrates an exemplary configuration of the service receiver 200B capable of processing ultra-high-definition moving image data with base frame rate. The parts in FIG. 29 corresponding to those in FIG. 24 are denoted with the same reference numerals or reference numerals with "B", and a detailed description thereof will be omitted as needed. The service receiver 200B includes the reception unit 201, a container decoder 203B, and a video decoder 204B.

The reception unit 201 receives the distribution stream STM of MP4 sent on a broadcast wave or an Internet packet from the service transmission system 100. The distribution stream STM is supplied to the container decoder 203B. The container decoder 203B extracts the base video stream STb and the extended video streams STe1 or the base video stream STb and the extended video stream STe from MP4.

The base video stream STb and the extended video stream STe1 or the base video stream STb and the extended video stream STe extracted in the container decoder 203B are supplied to the video decoder 204B. The video decoder 204B processes the base video stream STb and the extended video stream STe1 or the base video stream STb and the extended video stream STe thereby to obtain the ultra-high-definition image data Vb' with base frame rate.

Figure 30:
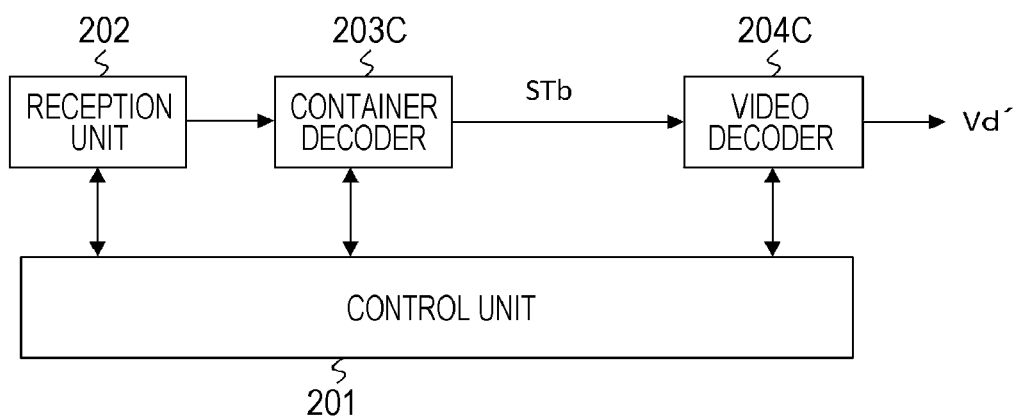
FIG. 30 is a block diagram illustrating an exemplary configuration of a service receiver capable of processing high-definition moving image data with base frame rate.

FIG. 30 illustrates an exemplary configuration of the service receiver 200C capable of processing high-definition moving image data with base frame rate. The parts in FIG. 30 corresponding to those in FIG. 24 are denoted with the same reference numerals or reference numerals with "C", and a detailed description thereof will be omitted as needed. The service receiver 200C includes the reception unit 201, a container decoder 203C, and a video decoder 204C.

The reception unit 201 receives the distribution stream STM of MP4 sent on a broadcast wave or an Internet packet from the service transmission system 100. The distribution stream STM is supplied to the container decoder 203C. The container decoder 203C extracts only the base video stream STb from MP4.

The base video stream STb extracted in the container decoder 203C is supplied to the video decoder 204C. The video decoder 204C processes only the base video stream STb thereby to obtain the high-definition image data Vd' with base frame rate.

As described above, the transmission/reception system 10 illustrated in FIG. 3 transmits the base video stream including the encoded image data of the image data in the base format for obtaining a high-definition image with base frame rate and two or one extended video stream including the encoded image data of the image data in the first extension format for obtaining an ultra-high-definition image with base frame rate and the encoded image data of the image data in the second extension format for obtaining an ultra-high-definition image with high frame rate. Thus, ultra-high-definition image data with high frame rate can be transmitted with preferable backward compatibility on the reception side.

For example, a receiver having the decode capability to process high-definition image data with base frame rate can process only the base video stream and can display a high-definition image with base frame rate. Further, for example, a receiver having the decode capability to process ultra-high-definition image data with base frame rate can process both the base video stream and the extended streams and can display an ultra-high-definition image with base frame rate. Further, for example, a receiver having the decode capability to process ultra-high-definition image data with high frame rate can process both the base video stream and the extended streams and can display an ultra-high-definition image with high frame rate.

Further, in the transmission/reception system 10 illustrated in FIG. 3, the image data in the base format is obtained by performing the downscale processing on first ultra-high-definition image data with base frame rate obtained by performing the first-ratio mixing processing on ultra-high-definition image data with high frame rate in units of two temporally-consecutive pictures. Thus, a high-definition image with base frame rate displayed by processing only the base video stream is restricted in the strobing effect to be a smooth image.

<2. Variant>

Additionally, the above embodiment demonstrates that a container is MP4 (ISOBMFF). However, the present technology is not limited to MP4 as container, and is similarly applicable to containers in other formats such as MPEG-2 TS and MMT.

For example, in a case of MPEG-2 TS, the container encoder 103 in the service transmission system 100 illustrated in FIG. 18 generates a transport stream including the base video stream STb and the extended video streams STe1 and STe2 or the base video stream STb and the extended stream STe.

At this time, the container encoder 103 inserts the video scalability information descriptor (see FIG. 12) into a video elementary stream loop corresponding to the extended video stream under a program map table (PMT).

Figure 31:
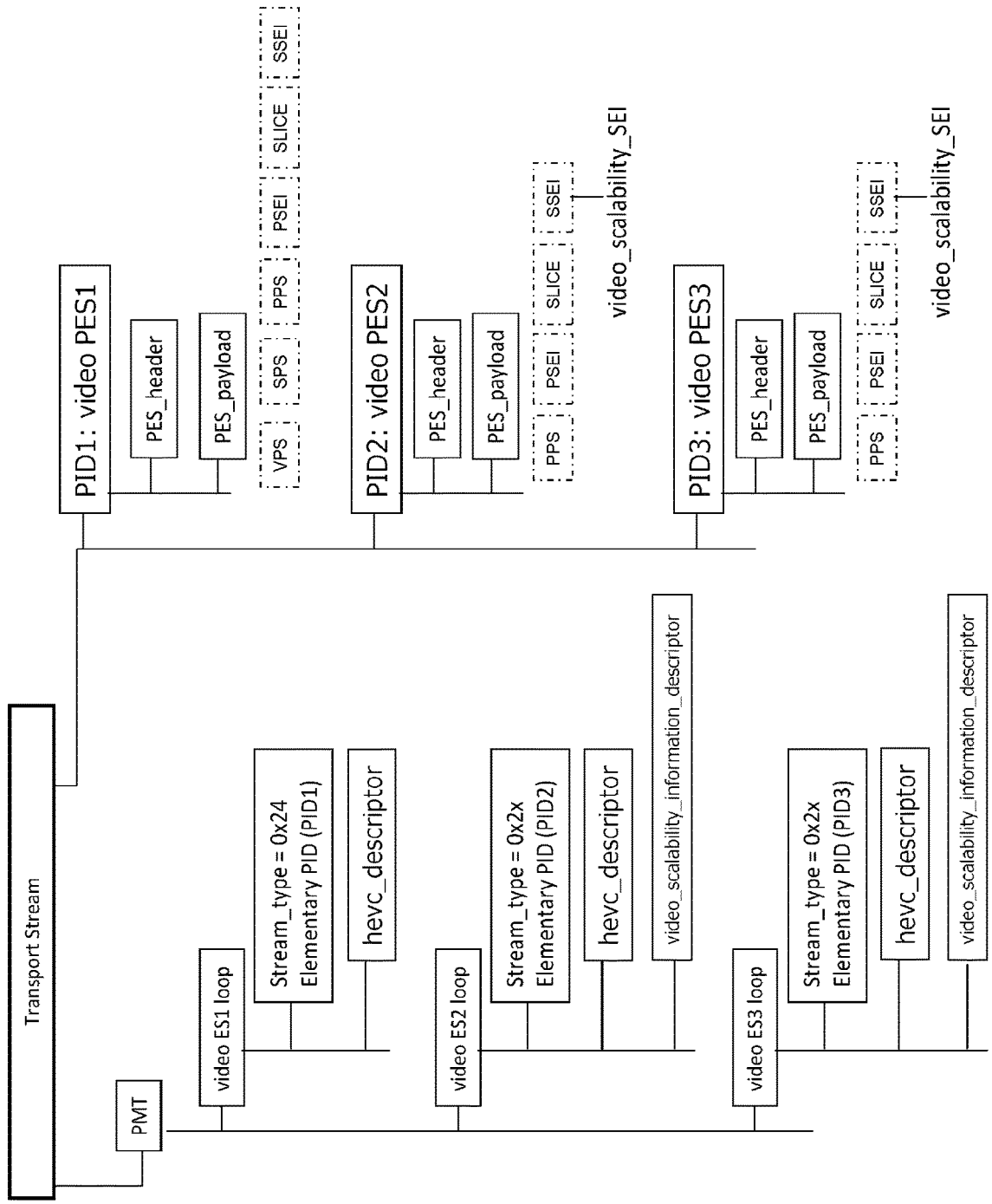
FIG. 31 is a diagram illustrating an exemplary configuration of a transport stream in transmitting three stream configurations.

FIG. 31 illustrates an exemplary configuration of a transport stream in transmitting three stream configurations. A PES packet "video PES1" of a video stream identified by PID1, a PES packet "video PES2" of a video stream identified by PID2, and a PES packet "video PES3" of a video stream identified by PID3 are present in the exemplary configuration.

The payload of the PES packet "video PES1" includes the access units (encoded image data) of the base video stream STb. The payload of the PES packet "video PES2" includes the access units (encoded image data) of the extended video stream STe1. The payload of the PES packet "video PES3" includes the access units (encoded image data) of the extended video stream STe2. The video scalability SEI (see FIG. 10) is inserted into the access units (encoded image data) of each picture contained in the PES packet "video PES2" and the PES packet "video PES3".

Further, the transport stream includes the program map table (PMT) as program specific information (PSI). PSI is information describing which program each elementary stream included in the transport stream belongs to.

A video elementary stream loop (video ES loop) corresponding to each video stream is present in PMT. Information regarding stream type, packet identifier (PID), and the like is arranged in the video elementary stream loop (video ES loop) in association with a video stream, and a descriptor describing information associated with the video stream is also arranged therein.

Information regarding stream type, packet identifier (PID), and the like is arranged in "video ES1 loop" in association with the base video stream (video PES1), and a descriptor describing information associated with the video stream is also arranged therein. The stream type is assumed at "0x24" indicating the base video stream.

Further, information regarding stream type, packet identifier (PID), and the like is arranged in "video ES2 loop" in association with the extended video stream (video PES2), and a descriptor describing information associated with the video stream is also arranged therein. The stream type is assumed at "0x2x" indicating the extended video stream. Further, the video scalability information descriptor (see FIG. 12) is inserted as one descriptor.

Further, information regarding stream type, packet identifier (PID), and the like is arranged in "video ES3 loop" in association with the extended video stream (video PES3), and a descriptor describing information associated with the video stream is also arranged therein. The stream type is assumed at "0x2x" indicating the extended video stream. Further, the video scalability information descriptor (see FIG. 12) is inserted as one descriptor.

Figure 32:
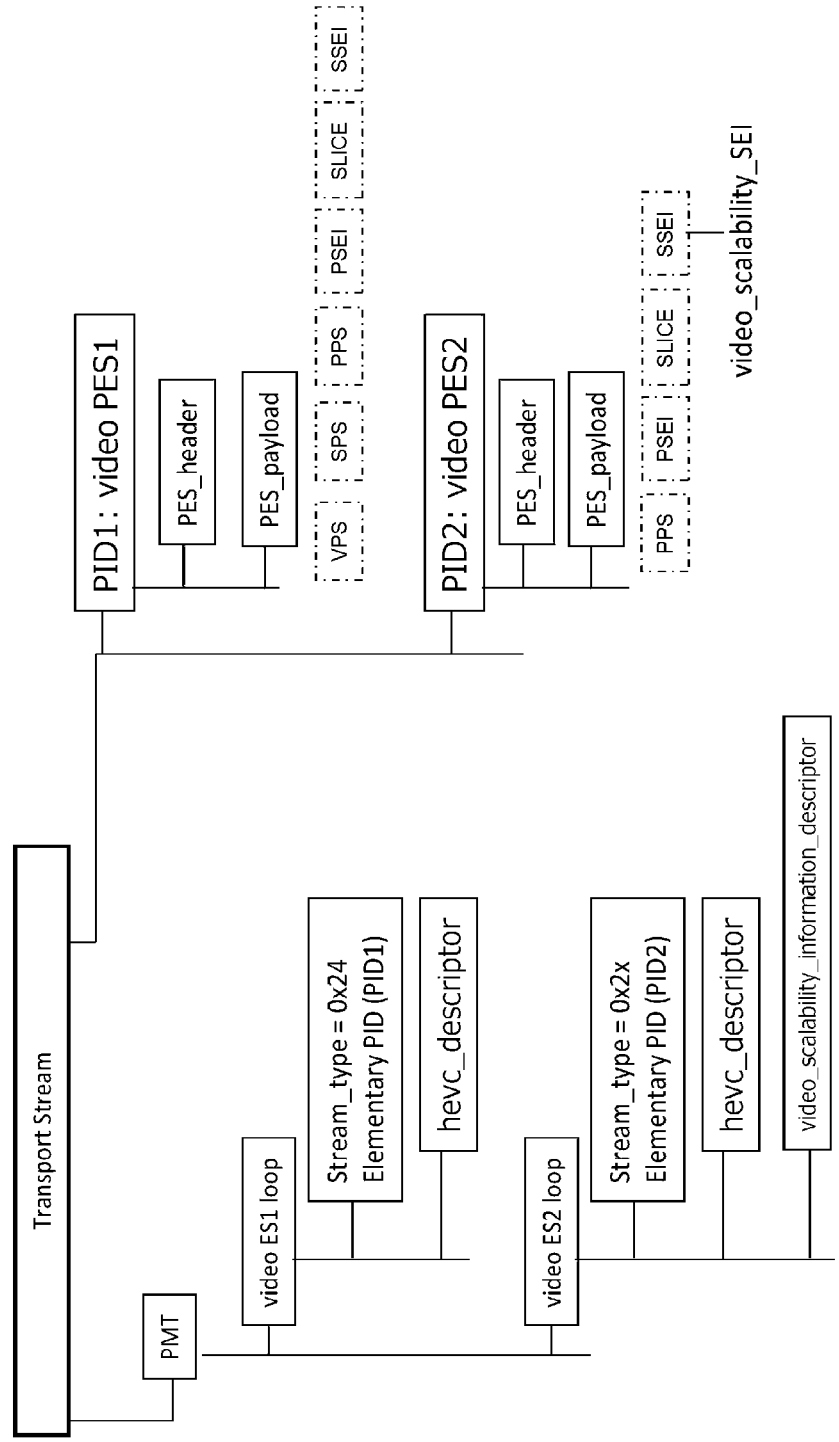
FIG. 32 is a diagram illustrating an exemplary configuration of a transport stream in transmitting two stream configurations.

FIG. 32 illustrates an exemplary configuration of a transport stream in transmitting two stream configurations. The PES packet "video PES1" of the video stream identified by PID1 and the PES packet "video PES2" of the video stream identified by PID2 are present in the exemplary configuration.

The payload of the PES packet "video PES1" includes the access units (encoded image data) of the base video stream STb. The payload of the PES packet "video PES2" includes the access units (encoded image data) of the extended video stream STe. The video scalability SEI (see FIG. 10) is inserted into the access units (encoded image data) of each picture contained in the PES packet "video PES2".

Furthermore, the video elementary stream loops (video ES loop) corresponding to the base video stream "video PES1" and the extended video stream "video PES2" are present under PMT. Information regarding stream type, packet identifier (PID), and the like is arranged in a video elementary stream loop (video ES loop) in association with a video stream, and a descriptor describing information associated with the video streams is also arranged.

Information regarding stream type, packet identifier (PID), and the like is arranged in "video ES1 loop" in association with the base video stream (video PES1), and a descriptor describing information associated with the video stream is also arranged therein. The stream type is assumed at "0×24" indicating the base video stream.

Further, information regarding stream type, packet identifier (PID), and the like is arranged in "video ES2 loop" in association with the extended video stream (video PES2), and a descriptor describing information associated with the video stream is also arranged therein. The stream type is assumed at "0×2x" indicating the extended video stream. Further, the video scalability information descriptor (see FIG. 12) is inserted as one descriptor.

Further, for example, in a case of MMT, the container encoder 103 in the service transmission system 100 illustrated in FIG. 18 generates a MMT stream including the base video stream STb and the extended video streams STe1 and STe2 or the base video stream STb and the extended stream STe.

At this time, the container encoder 103 inserts the video scalability information descriptor (see FIG. 12) into a video asset loop corresponding to the extended video stream under a MMT package table (MPT).

Figure 33:
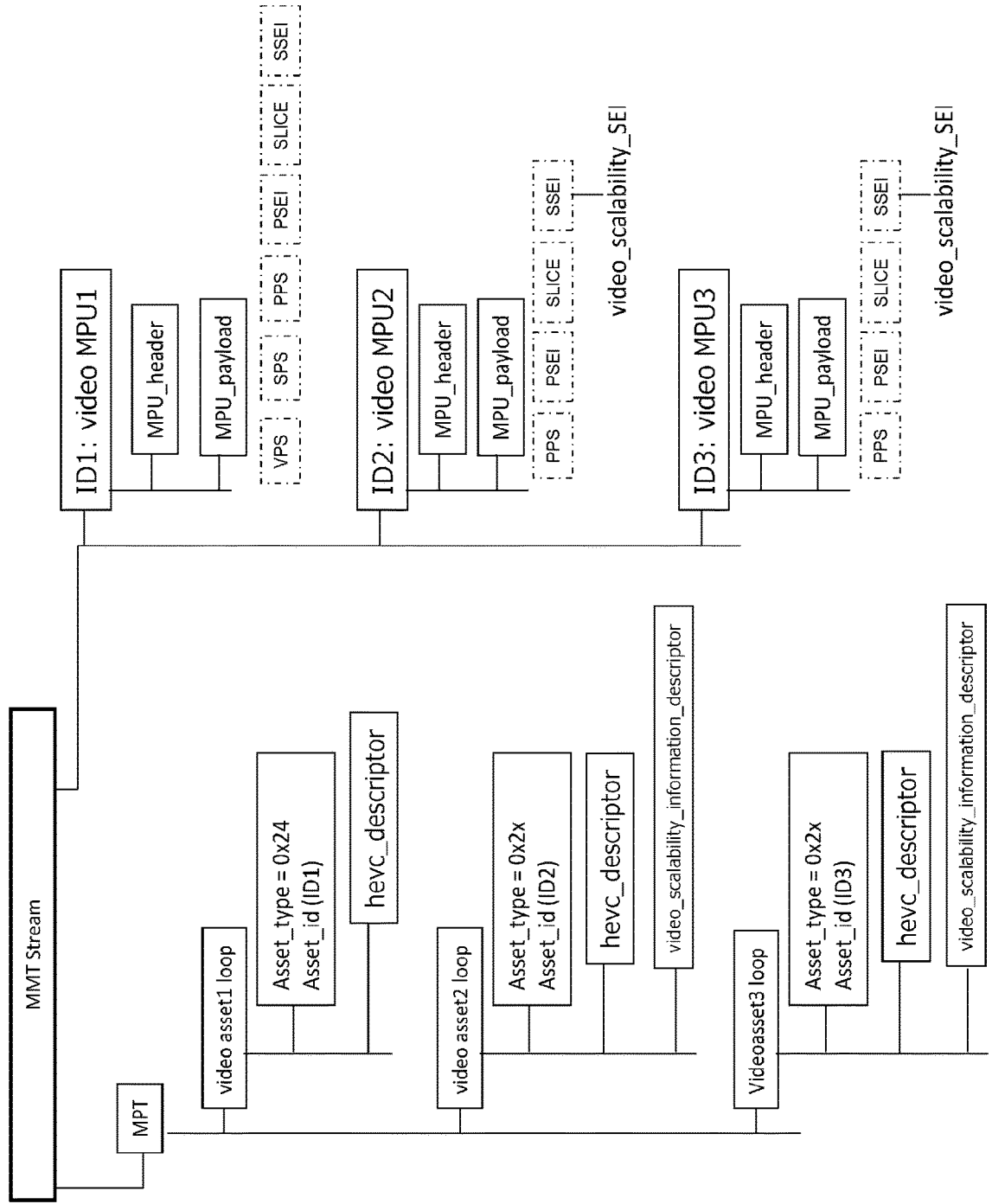
FIG. 33 is a diagram illustrating an exemplary configuration of a MMT stream in transmitting three stream configurations.

FIG. 33 illustrates an exemplary configuration of a MMT stream in transmitting three stream configurations. A MPU packet "video MPU1" of a video stream identified by ID1, a MPU packet "video MPU2" of a video stream identified by ID2, and a MPU packet "video MPU3" of a video stream identified by ID3 are present in the exemplary configuration.

The payload of the MPU packet "video MPU1" includes the access units (encoded image data) of the base video stream STb. The payload of the MPU packet "video MPU2" includes the access units (encoded image data) of the extended video stream STe1. The payload of the MPU packet "video MPU3" includes the access units (encoded image data) of the extended video stream STe2. The video scalability SEI (see FIG. 10) is inserted into the access units (encoded image data) of each picture contained in the MPU packet "video MPU2" and the MPU packet "video MPU3".

Further, a message packet such as packet access (PA) message packet is present in the MMT stream. The PA message packet includes a table such as MPT. A video asset loop corresponding to each asset (video stream) is present in MPT. Information regarding asset type (Asset_type), asset ID (Asset_id), and the like is arranged in the video asset loop in association with asset (video stream), and a descriptor describing information associated with the video stream is also arranged therein.

Information regarding asset type, asset ID, and the like is arranged in "video asset1 loop" in association with the base video stream (video MPU1), and a descriptor describing information associated with the video stream is also arranged therein. The asset type is assumed at "0×24" indicating the base video stream.

Further, information regarding asset type, asset ID, and the like is arranged in "video asset2 loop" in association with the extended video stream (video MPU2), and a descriptor describing information associated with the video stream is also arranged therein. The asset type is assumed at "0×2x" indicating the extended video stream. Further, the video scalability information descriptor (see FIG. 12) is inserted as one descriptor.

Further, information regarding asset type, asset ID, and the like is arranged in "video asset3 loop" in association with the extended video stream (video MPU3), and a descriptor describing information associated with the video stream is also arranged therein. The stream type is assumed at "0×2x" indicating the extended video stream. Further, the video scalability information descriptor (see FIG. 12) is also inserted as one descriptor.

Figure 34:
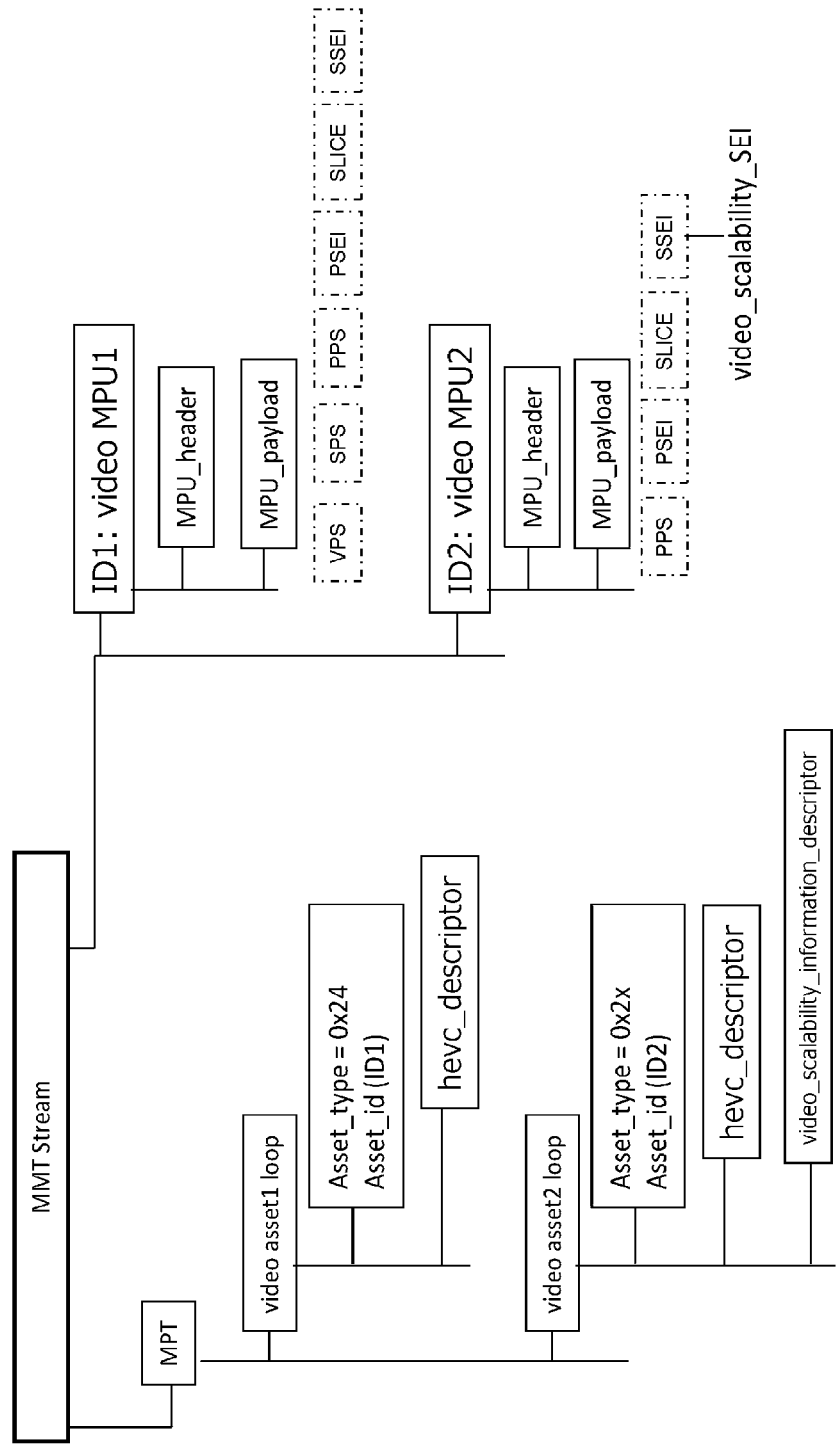
FIG. 34 is a diagram illustrating an exemplary configuration of a MMT stream in transmitting two stream configurations.

FIG. 34 illustrates an exemplary configuration of the MMT stream in transmitting two stream configurations. A MPU packet "video MPU1" of a video stream identified by ID1 and a MPU packet "video MPU2" of a video stream identified by PID2 are present in the exemplary configuration.

The payload of the MPU packet "video MPU1" includes the access units (encoded image data) of the base video stream STb. The payload of the MPU packet "video MPU2" includes the access units (encoded image data) of the extended video stream STe. The video scalability SEI (see FIG. 10) is inserted into the access units (encoded image data) of each picture contained in the MPU packet "video PES2".

Further, video asset loops corresponding to the base video stream "video MPU1" and the extended video stream "video MPU2" are present under MPT. Information regarding asset type, asset ID, and the like is arranged in a video asset loop in association with a video stream, and a descriptor describing information associated with the video stream is also arranged therein.

Information regarding stream type, packet identifier (PID), and the like is arranged in "video asset1 loop" in association with the base video stream (video MPU1), and a descriptor describing information associated with the video stream is also arranged therein. The asset type is assumed at "0×24" indicating the base video stream.

Further, information regarding asset type, asset ID, and the like is arranged in "video ES2 loop" in association with the extended video stream (video PES2), and a descriptor describing information associated with the video stream is also arranged therein. The asset type is assumed at "0×2x" indicating the extended video stream. Further, the video scalability information descriptor (see FIG. 12) is inserted as one descriptor.

Further, the present technology can take the following configurations.

(1) A transmission device including:

an image processing unit configured to process ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;

an image encoding unit configured to generate a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format; and a transmission unit configured to transmit a container in a predetermined format including the base stream and the two or one extended video stream, in which the image processing unit performs a first-ratio mixing processing on the ultra-high-definition image data with high frame rate in units of two temporally-consecutive pictures to obtain first ultra-high-definition image data with base frame rate, performs a second-ratio mixing processing in units of the two temporally-consecutive pictures to obtain the image data in the second extension format, performs a downscale processing on the first image data to obtain the image data in the base format, and takes a difference between second ultra-high-definition image data with base frame rate obtained by performing an upscale processing on the image data in the base format and the first image data to obtain the image data in the first extension format.

(2) The transmission device according to (1), further including:

an information insertion unit configured to insert identification information indicating being spatially scalable into the encoded image data of the image data in the first extension format.

(3) The transmission device according to (2), in which the information insertion unit further inserts information indicating a spatially-scalable ratio into the encoded image data of the image data in the first extension format.

(4) The transmission device according to any of (1) to (3), further including:

an information insertion unit configured to insert identification information indicating being temporally scalable into the encoded image data of the image data in the second extension format.

(5) The transmission device according to (4), in which the information insertion unit further inserts identification information indicating that the image data in the base format is obtained by performing the mixing processing into the encoded image data of the image data in the second extension format.

(6) The transmission device according to (5), in which the information insertion unit further inserts information regarding the first ratio and information regarding the second ratio into the encoded image data of the image data in the second extension format.

(7) The transmission device according to any of (1) to (6), further including:

an information insertion unit configured to insert identification information indicating being spatially scalable into a layer of the container corresponding to the encoded image data of the image data in the first extension format.

(8) The transmission device according to (7), in which the information insertion unit further inserts information indicating a spatially-scalable ratio into the layer of the container corresponding to the encoded image data of the image data in the first extension format.

(9) The transmission device according to any of (1) to (8), further including:

an information insertion unit configured to insert identification information indicating being temporally scalable into the layer of the container corresponding to the encoded image data of the image data in the second extension format.

(10) The transmission device according to (9), in which the information insertion unit further inserts identification information indicating that the image data in the base format is obtained by performing the mixing processing into the layer of the container corresponding to the encoded image data of the image data in the second extension format.

(11) The transmission device according to (10), in which the information insertion unit further inserts the information regarding the first ratio and the information regarding the second ratio into the layer of the container corresponding to the encoded image data of the image data in the second extension format.

(12) The transmission device according to any of (1) to (11), further including:

a transmission unit configured to transmit a meta-file having meta-information for causing a reception device to obtain the base video stream and the two or one extended video stream, in which information indicating a correspondence of scalability is inserted into the meta-file.

(13) A transmission method including:

an image processing step of processing ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;

an image encoding step of generating a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format; and a transmission step of transmitting a container in a predetermined format including the base stream and the two or one extended video stream by a transmission unit, in which in the image processing step, a first-ratio mixing processing is performed on the ultra-high-definition image data with high frame rate in units of two temporally-consecutive pictures to obtain first ultra-high-definition image data with base frame rate, a second-ratio mixing processing is performed in units of the two temporally-consecutive pictures to obtain the image data in the second extension format, a downscale processing is performed on the first image data to obtain the image data in the base format, and a difference between second ultra-high-definition image data with base frame rate obtained by performing an upscale processing on the image data in the base format and the first image data is taken to obtain the image data in the first extension format.

(14) A reception device including:

a reception unit configured to receive a container in a predetermined format including a base video stream having encoded image data of image data in a base format for obtaining a high-definition image with base frame rate, and two extended video streams having encoded image data of image data in a first extension format for obtaining an ultra-high-definition image with base frame rate and encoded image data of image data in a second extension format for obtaining an ultra-high-definition image with high frame rate, respectively, or one extended video stream having both the encoded image data of the image data in the first extension format and the encoded image data of the image data in the second extension format, in which the image data in the second extension format is obtained by performing a second-ratio mixing processing on ultra-high-definition image data with high frame rate in units of two temporally-consecutive pictures, the image data in the base format is obtained by performing a downscale processing on first ultra-high-definition image data with base frame rate obtained by performing a first-ratio mixing processing in units of the two temporally-consecutive pictures, the image data in the first extension format is obtained by taking a difference between second ultra-high-definition image data with base frame rate obtained by performing an upscale processing on the image data in the base format and the first image data, and the reception device further includes a processing unit configured to process only the base video stream to obtain high-definition image data with base frame rate, or to process both the base video stream and the extended video streams to obtain ultra-high-definition image data with base frame rate or ultra-high-definition image data with high frame rate.

(15) The reception device according to (14), in which information indicating a spatially-scalable ratio is inserted into the encoded image data of the image data in the first extension format and/or a container position corresponding to the encoded image data, and the processing unit uses the inserted information indicating a spatially-scalable ratio to obtain the ultra-high-definition image data with base frame rate.

(16) The reception device according to (14), in which information indicating a spatially-scalable ratio is inserted into the encoded image data of the image data in the first extension format and/or a container position corresponding to the encoded image data, information regarding the first ratio and information regarding the second ratio are inserted into the encoded image data of the image data in the second extension format and/or a container position corresponding to the encoded image data, and the processing unit uses the inserted information indicating a spatially-scalable ratio as well as the information regarding the first ratio and the information regarding the second ratio to obtain the ultra-high-definition image data with high frame rate.

(17) A reception method including:

a reception step of receiving, by a reception unit, a container in a predetermined format including a base video stream having encoded image data of image data in a base format for obtaining a high-definition image with base frame rate, and two extended video streams having encoded image data of image data in a first extension format for obtaining an ultra-high-definition image with base frame rate and encoded image data of image data in a second extension format for obtaining an ultra-high-definition image with high frame rate, respectively, or one extended video stream having both the encoded image data of the image data in the first extension format and the encoded image data of the image data in the second extension format, in which the image data in the second extension format is obtained by performing a second-ratio mixing processing on ultra-high-definition image data with high frame rate in units of two temporally-consecutive pictures, the image data in the base format is obtained by performing a downscale processing on first ultra-high-definition image data with base frame rate obtained by performing a first-ratio mixing processing in units of the two temporally-consecutive pictures, the image data in the first extension format is obtained by taking a difference between second ultra-high-definition image data with base frame rate obtained by performing an upscale processing on the image data in the base format and the first image data, and the reception method further includes a processing step of processing only the base video stream to obtain high-definition image data with base frame rate, or processing both the base video stream and the extended video streams to obtain ultra-high-definition image data with base frame rate or ultra-high-definition image data with high frame rate.

(18) A transmission device including:

an image processing unit configured to process ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;

an image encoding unit configured to generate a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format; and a transmission unit configured to transmit a container in a predetermined format including the base stream and the two or one extended video stream.

19. A reception device including:

a reception unit configured to receive a container in a predetermined format including a base video stream having encoded image data of image data in a base format for obtaining a high-definition image with base frame rate, and two extended video streams having encoded image data of image data in a first extension format for obtaining an ultra-high-definition image with base frame rate and encoded image data of image data in a second extension format for obtaining an ultra-high-definition image with high frame rate, respectively, or one extended video stream having both the encoded image data of the image data in the first extension format and the encoded image data of the image data in the second extension format; and a processing unit configured to process only the base video stream to obtain high-definition image data with base frame rate, or to process both the base video stream and the extended video streams to obtain ultra-high-definition image data with base frame rate or ultra-high-definition image data with high frame rate.

A main feature of the present technology is that a base video stream including encoded image data of image data in a base format for obtaining a high-definition image with base frame rate and two or one extended video stream including encoded image data of image data in a first extension format for obtaining an ultra-high-definition image with base frame rate and encoded image data of image data in a second extension format for obtaining an ultra-high-definition image with high frame rate are transmitted thereby to realize ultra-high-definition image data with high frame rate along with preferable backward compatibility on the reception side (see FIG. 5, FIG. 6, and FIG. 14).

Further, another feature of the present technology is that a downscale processing is performed on first ultra-high-definition image data with base frame rate obtained by performing a mixing processing on ultra-high-definition image data with high frame rate in units of two temporally-consecutive pictures thereby to obtain image data in a base format, and thus only a base video stream is processed to obtain a high-definition image with displayed base frame rate restricted in the strobing effect to be a smooth image (see FIG. 20 and FIG. 21).

REFERENCE SIGNS LIST

10: Transmission/reception system
30A, 30B: MPEG-DASH-based stream distribution system
31: DASH stream file server
32: DASH MPD server
33, 33-1 to 33-N: Service receiver
34: CDN
35, 35-1 to 35-M: Service receiver
36: Broadcast sending system
100: Service transmission system
101: Control unit
102: Video encoder
102a, 102b: Signal processing unit
102c: Encoding processing unit
103: Container encoder
104: Transmission unit
111: Delay circuit
112: Calculation circuit
112a, 112b, 112c, 112d: Coefficient multiplication unit
112e, 112f: Addition unit
113: Latch circuit
121: Downscale circuit
122: Upscale circuit
123: Calculation circuit
200, 200A, 200B, 200C: Service receiver
201: Control unit
202: Reception unit
203, 203B, 203C: Container decoder
204, 204B, 204C: Video decoder
204a, 204b: Signal processing unit
204c: Decoding processing unit
211: Upscale circuit
212: Calculation circuit
241: Calculation circuit
241a, 241b, 241c, 241d: Coefficient multiplication unit
241e, 241f: Addition unit
242: Switch circuit

The invention claimed is:

1. A transmission device comprising:
processing circuitry configured to
process ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;
generate a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format;
perform a first-ratio mixing processing on the ultra-high-definition image data with high frame rate in units of two temporally-consecutive pictures to obtain first ultra-high-definition image data with base frame rate,
perform a second-ratio mixing processing in units of the two temporally-consecutive pictures to obtain the image data in the second extension format, and
perform a downscale processing on the first image data to obtain the image data in the base format, and take a difference between second ultra-high-definition image data with base frame rate obtained by performing an upscale processing on the image data in the base format and the first image data to obtain the image data in the first extension format; and
a transceiver configured to transmit a container in a predetermined format including the base stream and the two or one extended video stream.

2. The transmission device according to claim 1, wherein the processing circuitry is further configured to
insert identification information indicating being spatially scalable into the encoded image data of the image data in the first extension format.

3. The transmission device according to claim 2, wherein the processing circuitry is further configured to
insert information indicating a spatially-scalable ratio into the encoded image data of the image data in the first extension format.

4. The transmission device according to claim 1, wherein the processing circuitry is further configured to
insert identification information indicating being temporally scalable into the encoded image data of the image data in the second extension format.

5. The transmission device according to claim 4, wherein the processing circuitry is further configured to
insert identification information indicating that the image data in the base format is obtained by performing the mixing processing into the encoded image data of the image data in the second extension format.

6. The transmission device according to claim 5, wherein the processing circuitry is further configured to
insert information regarding the first ratio and information regarding the second ratio into the encoded image data of the image data in the second extension format.

7. The transmission device according to claim 1, wherein the processing circuitry is further configured to
insert identification information indicating being spatially scalable into a layer of the container corresponding to the encoded image data of the image data in the first extension format.

8. The transmission device according to claim 7, wherein the processing circuitry is further configured to
insert information indicating a spatially-scalable ratio into the layer of the container corresponding to the encoded image data of the image data in the first extension format.

9. The transmission device according to claim 1, wherein the processing circuitry is further configured to
insert identification information indicating being temporally scalable into the layer of the container corresponding to the encoded image data of the image data in the second extension format.

10. The transmission device according to claim 9, wherein the processing circuitry is further configured to
insert identification information indicating that the image data in the base format is obtained by performing the mixing processing into the layer of the container corresponding to the encoded image data of the image data in the second extension format.

11. The transmission device according to claim 10, wherein the processing circuitry is further configured to
insert the information regarding the first ratio and the information regarding the second ratio into the layer of the container corresponding to the encoded image data of the image data in the second extension format.

12. The transmission device according to claim 1, wherein the transceiver is further configured to
   transmit a meta-file having meta-information for causing a reception device to obtain the base video stream and the two or one extended video stream,
   wherein information indicating a correspondence of scalability is inserted into the meta-file.

13. A transmission method comprising:
   an image processing step of processing ultra-high-definition image data with high frame rate to obtain image data in a base format for obtaining a high-definition image with base frame rate, image data in a first extension format for obtaining an ultra-high-definition image with base frame rate, and image data in a second extension format for obtaining an ultra-high-definition image with high frame rate;
   an image encoding step of generating a base video stream including encoded image data of the image data in the base format, and two extended video streams including encoded image data of the image data in the first extension format and encoded image data of the image data in the second extension format, respectively, or one extended video stream including both the encoded image data of the image data in the first extension format and the encoded image data of the image data in the second extension format; and
   a transmission step of transmitting a container in a predetermined format including the base stream and the two or one extended video stream by a transmission unit,
   wherein in the image processing step, a first-ratio mixing processing is performed on the ultra-high-definition image data with high frame rate in units of two temporally-consecutive pictures to obtain first ultra-high-definition image data with base frame rate, a second-ratio mixing processing is performed in units of the two temporally-consecutive pictures to obtain the image data in the second extension format, a downscale processing is performed on the first image data to obtain the image data in the base format, and a difference between second ultra-high-definition image data with base frame rate obtained by performing an upscale processing on the image data in the base format and the first image data is taken to obtain the image data in the first extension format.

14. A reception device comprising:
   a receiver configured to receive a container in a predetermined format including a base video stream having encoded image data of image data in a base format for obtaining a high-definition image with base frame rate, and two extended video streams having encoded image data of image data in a first extension format for obtaining an ultra-high-definition image with base frame rate and encoded image data of image data in a second extension format for obtaining an ultra-high-definition image with high frame rate, respectively, or one extended video stream having both the encoded image data of the image data in the first extension format and the encoded image data of the image data in the second extension format,
   wherein the image data in the second extension format is obtained by performing a second-ratio mixing processing on ultra-high-definition image data with high frame rate in units of two temporally-consecutive pictures,
   wherein the image data in the base format is obtained by performing a downscale processing on first ultra-high-definition image data with base frame rate obtained by performing a first-ratio mixing processing in units of the two temporally-consecutive pictures,
   wherein the image data in the first extension format is obtained by taking a difference between second ultra-high-definition image data with base frame rate obtained by performing an upscale processing on the image data in the base format and the first image data, and
   wherein the receiver further comprises a processing unit configured to process only the base video stream to obtain high-definition image data with base frame rate, or to process both the base video stream and the extended video streams to obtain ultra-high-definition image data with base frame rate or ultra-high-definition image data with high frame rate.

15. The reception device according to claim 14,
   wherein information indicating a spatially-scalable ratio is inserted into the encoded image data of the image data in the first extension format and/or a container position corresponding to the encoded image data, and
   processing circuitry is configured to
      use the inserted information indicating a spatially-scalable ratio to obtain the ultra-high-definition image data with base frame rate.

16. The reception device according to claim 14,
   wherein information indicating a spatially-scalable ratio is inserted into the encoded image data of the image data in the first extension format and/or a container position corresponding to the encoded image data,
   information regarding the first ratio and information regarding the second ratio are inserted into the encoded image data of the image data in the second extension format and/or a container position corresponding to the encoded image data, and
   processing circuitry configured to
      use the inserted information indicating a spatially-scalable ratio as well as the information regarding the first ratio and the information regarding the second ratio to obtain the ultra-high-definition image data with high frame rate.

17. A reception method comprising:
   a reception step of receiving, by a receiver, a container in a predetermined format including a base video stream having encoded image data of image data in a base format for obtaining a high-definition image with base frame rate, and two extended video streams having encoded image data of image data in a first extension format for obtaining an ultra-high-definition image with base frame rate and encoded image data of image data in a second extension format for obtaining an ultra-high-definition image with high frame rate, respectively, or one extended video stream having both the encoded image data of the image data in the first extension format and the encoded image data of the image data in the second extension format,
   wherein the image data in the second extension format is obtained by performing a second-ratio mixing processing on ultra-high-definition image data with high frame rate in units of two temporally-consecutive pictures,
   wherein the image data in the base format is obtained by performing a downscale processing on first ultra-high-definition image data with base frame rate obtained by performing a first-ratio mixing processing in units of the two temporally-consecutive pictures,
   wherein the image data in the first extension format is obtained by taking a difference between second ultra-high-definition image data with base frame rate obtained by performing an upscale processing on the image data in the base format and the first image data; and a processing step of processing only the base video stream to obtain high-definition image data with base frame rate, or processing both the base video stream and the extended video streams to obtain ultra-high-definition image data with base frame rate or ultra-high-definition image data with high frame rate.

* * * * *